(12) United States Patent
Nakata et al.

(10) Patent No.: US 7,052,794 B2
(45) Date of Patent: May 30, 2006

(54) FUEL CELL SEPARATOR, MANUFACTURING METHOD THEREOF AND FUEL CELL

(75) Inventors: Hiromichi Nakata, Toyota (JP); Masayoshi Yokoi, Okazaki (JP); Joji Yoshimura, Toyota (JP); Kenichi Suzuki, Aichi-gun (JP); Fumio Nonoyama, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 132 days.

(21) Appl. No.: 09/837,480

(22) Filed: Apr. 19, 2001

(65) Prior Publication Data

US 2001/0033957 A1    Oct. 25, 2001

(30) Foreign Application Priority Data

Apr. 19, 2000    (JP) .............................. 2000-117734

(51) Int. Cl.
  *H01M 2/16*    (2006.01)
(52) U.S. Cl. ........................... 429/34; 429/38; 429/39; 427/115
(58) Field of Classification Search .................. 429/34, 429/38, 39; 427/115
See application file for complete search history.

(56) References Cited

U.S. PATENT DOCUMENTS

| | | | |
|---|---|---|---|
| 5,064,734 A | | 11/1991 | Nazmy ........................ 429/33 |
| 5,624,769 A | * | 4/1997 | Li et al. ........................ 429/32 |
| 5,631,099 A | * | 5/1997 | Hockaday .................... 429/30 |
| 5,798,188 A | * | 8/1998 | Mukohyama et al. ......... 429/34 |
| 6,090,228 A | * | 7/2000 | Hwang et al. ............... 148/518 |
| 6,280,868 B1 | * | 8/2001 | Badwal et al. ................ 429/34 |
| 6,291,094 B1 | * | 9/2001 | Yoshimura et al. ........... 429/34 |
| 6,372,376 B1 | * | 4/2002 | Fronk et al. .................. 429/41 |
| 6,383,678 B1 | * | 5/2002 | Kaneko et al. ............... 429/34 |

FOREIGN PATENT DOCUMENTS

| | | |
|---|---|---|
| CA | 2 270 860 | 8/2004 |
| DE | 199 46 695 | 4/2000 |
| DE | 100 17 058 | 10/2001 |

(Continued)

OTHER PUBLICATIONS

B.C. Cullity, Elements of X-Ray Diffraction, 2nd edition, pp. 281-282. 1978 (no month).*

(Continued)

*Primary Examiner*—Tracy Dove
(74) *Attorney, Agent, or Firm*—Kenyon & Kenyon

(57) ABSTRACT

A separator is provided with a substrate portion having a predetermined concave-convex shape, an underlying coating layer formed on the substrate portion, a first coating layer coating the substrate portion and the underlying coating layer, and a second coating layer formed thereon. The second coating layer, which is formed from carbon materials, is sufficiently electrically conductive and protects the underlying layers. The first coating layer is formed from a low-melting-point metal subjected to a melting process. The melting process is a process of first conducting heating at such a temperature that melts the low-melting-point metal but does not melt the substrate portion and the underlying coating layer and then conducting cooling. Thus, in the first coating layer, the crystal grain size of the metal is increased and thus the grain boundary density is reduced.

10 Claims, 11 Drawing Sheets

FOREIGN PATENT DOCUMENTS

| | | | |
|---|---|---|---|
| EP | 0 955 686 | | 11/1999 |
| JP | (A) 60 115173 | | 6/1985 |
| JP | A-07-070764 | | 3/1995 |
| JP | 10-055811 | | 2/1998 |
| JP | A-10-255823 | | 9/1998 |
| JP | 2000-036309 | * | 2/2000 |
| JP | 2000036309 A | * | 2/2000 |
| JP | 2000100452 A | * | 4/2000 |
| WO | WO00/003446 | | 1/2000 |

OTHER PUBLICATIONS

Hawley's Condensed Chemical Dictionary, 11th edition, p. 835 1987 (no month).*

Copy of Official Action dated Feb. 26, 2003 in copending Application Serial No. 09/802,959.

Patent Abstracts of Japan JP 10 308226 Nov. 17, 1998 Aisin Seiki Co. Ltd.

* cited by examiner

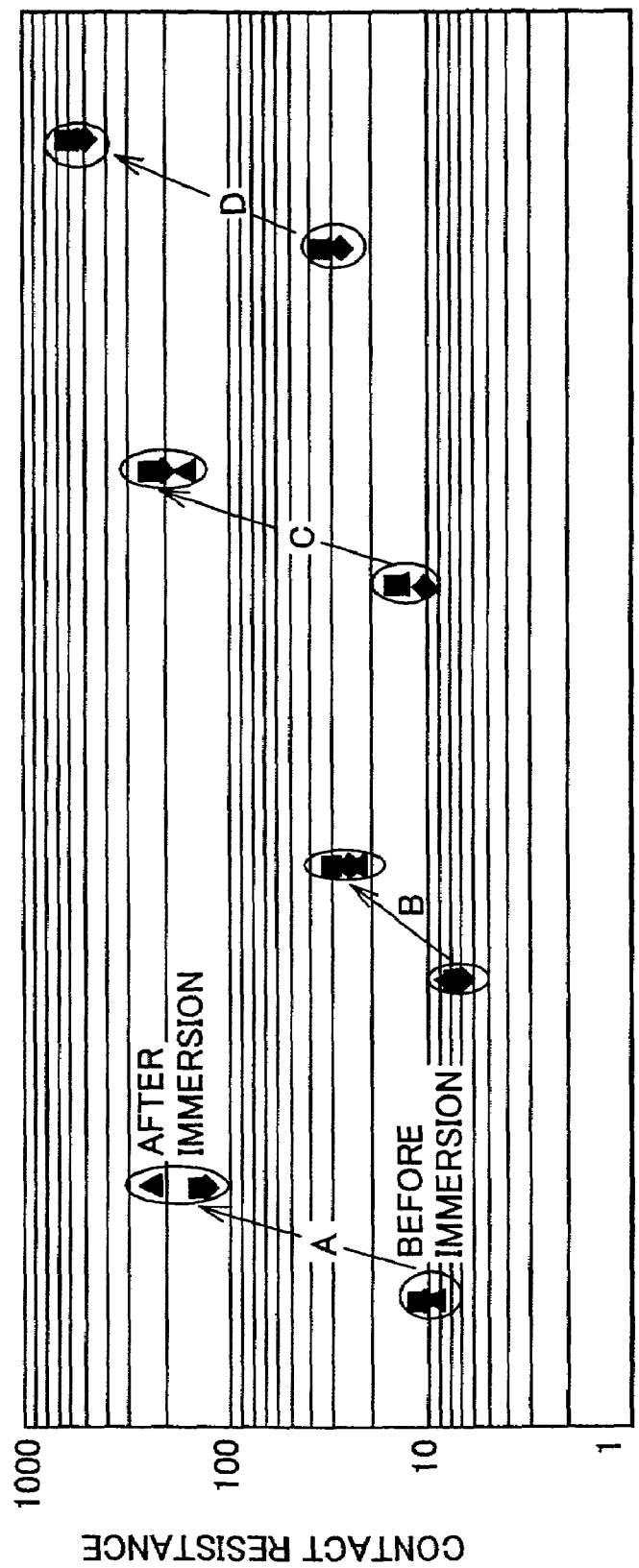

| SURFACE TREATMENT | CORROSION CURRENT *1 ($\mu$A/cm²) | CONTACT RESISTANCE *2 (m$\Omega$cm²) |
|---|---|---|
| E:0.1 $\mu$mAg/10 $\mu$mCu | 6.9 | 10 OR LESS |
| F:0.1 $\mu$mAg/10 $\mu$mSn(UNPROCESSED) /10 $\mu$mCu | 21.9 | 10 OR LESS |
| G:0.1 $\mu$mAg/10 $\mu$mSn(MELTING PROCESS) /10 $\mu$mCu | 0.3 | 10 OR LESS |

*1: RESULT OBTAINED WITHOUT CARBON COATING LAYER OF CARBON MATERIALS

*2: RESULT OBTAINED WITH CARBON COATING LAYER OF CARBON MATERIALS

F I G. 14

| SEPARATOR BASE MATERIAL* | PREDETERMINED PROCESS* | METAL COATING LAYER* | CONDUCTIVE PARTICLES* | CORROSION-RESISTANT COATING LAYER* | CARBON COATING LAYER* |
|---|---|---|---|---|---|
| PRESENT | PRESENT | METAL HAVING LOWER MELTING POINT THAN MATERIAL OF SEPARATOR BASE MATERIAL AND HAVING BEEN SUBJECTED TO MELTING PROCESS OR METAL HAVING CRYSTAL GRAIN SIZE OF 0.1 mm OR MORE | PRESENT | PRESENT | PRESENT |
| | NONE | | NONE | NONE | NONE |

*: ANY MATERIAL AS DESCRIBED IN THE SPECIFICATION CAN BE SELECTED AS APPROPRIATE

FUEL CELL SEPARATOR, MANUFACTURING METHOD THEREOF AND FUEL CELL

INCORPORATION BY REFERENCE

The disclosure of Japanese Patent Application No. 2000-117734 filed on Apr. 19, 2000 including the specification, drawings and abstract is incorporated herein by reference in its entirety.

BACKGROUND OF THE INVENTION

1. Field of the Invention

The invention relates to a fuel cell separator, a manufacturing method thereof, and a fuel cell. More particularly, the invention relates to a fuel cell separator provided between adjacent single cells in a fuel cell having a plurality of single cells stacked on each other, for forming a fuel gas flow path or an oxidized gas flow path together with an adjacent member and for separating the fuel gas and the oxidized gas from each other, a manufacturing method thereof, and the fuel cell.

2. Description of Related Art

A fuel cell gas separator is a member that forms a fuel cell stack having a plurality of single cells stacked on each other. The fuel cell gas separator has sufficient gas non-permeability in order to prevent the fuel gas and oxidized gas supplied to each of adjacent single cells from mixing together. Conventionally, such a fuel cell gas separator has been manufactured by using a carbon material or metal material. In general, a metal material has a good strength, and therefore makes it possible to manufacture a thinner gas separator as compared to the case of the carbon material. Such a reduced thickness of the gas separator enables reduction in overall size of the fuel cell. Moreover, a metal gas separator can be manufactured by a simple method of pressing a metal sheet. As a result, a quick, simplified manufacturing process can be realized, resulting in improved productivity. Thus, increase in manufacturing cost can be prevented.

A metal used for manufacturing the metal gas separator can be selected as appropriate from the metals having sufficient electrical conductivity, strength and formability. In particular, by using a metal that is mass distributed as a metal material like stainless steel and aluminum, significant reduction in manufacturing cost can be achieved. The use of such a metal material normally requires the structure for ensuring sufficient corrosion resistance in the operation environment of the fuel cell. As the structure for improving corrosion resistance of the gas separator, the structure of coating the surface of the gas separator with silver has been proposed (e.g., Japanese Patent Laid-Open Publication No. SHO 60-115173). By coating the surface with silver, corrosion resistance of the metal gas separator can be significantly improved.

However, in the case where plating is used to coat the gas separator with a metal having excellent corrosion resistance, it is difficult to form a sufficiently compact coating layer. In other words, pores are formed in the coating layer. As a result, even if the coating layer itself is formed from a noble metal having excellent corrosion resistance, a substrate portion of the separator covered with the coating layer is gradually corroded through the pores formed therein, whereby the overall corrosion resistance of the gas separator is reduced. In order to sufficiently suppress the effects of corrosion through the pores in the coating layer, it is necessary to form the coating layer with a larger thickness, resulting in increase in the amount of the noble metal to be used. Therefore, the use of such a method is not desirable.

SUMMARY OF THE INVENTION

A fuel cell gas separator, a manufacturing method thereof and a fuel cell according to the invention are made to solve the aforementioned problems, and it is an object of the invention to implement sufficient corrosion resistance in a metal gas separator. Thus, the invention uses the following structure.

In order to achieve the aforementioned object, a fuel cell separator according to a first aspect of the invention includes a separator base material, and a metal coating layer formed from a metal and formed at least on a part of a surface of the separator base material, i.e., at least on a region of the separator associated with electrical contact resistance between the separator and an adjacent member [out] of the fuel cell when the separator [base material surface corresponding to a contact surface that] is brought into contact with the adjacent member when the separator is integrated into the fuel cell. The metal coating layer is formed from the predetermined metal that is successively subjected to melting and gradual cooling.

A method for manufacturing a fuel cell separator according to a first aspect of the invention includes the steps of (a) forming a layer of a predetermined molten metal at least on a partial region of a separator base material forming the fuel cell separator, and (b) gradually cooling and solidifying the layer of the predetermined molten metal formed in the step (a) so as to form a metal coating layer.

A method for manufacturing a fuel cell separator according to a second aspect of the invention includes the steps of (c) forming a plating layer of a predetermined metal at least on a partial region of a separator base material forming the fuel cell separator, (d) melting the predetermined metal forming the plating layer at a temperature equal to or lower than a melting point of the separator base material, and (e) gradually cooling and solidifying the predetermined metal melted in the step (d) so as to form a metal coating layer.

With such a structure, the fuel cell separator according to the first aspect of the invention as well as the methods for manufacturing the fuel cell separator according to the first and second aspects of the invention provide a fuel cell separator including a metal coating layer that is formed from a metal subjected to a process involving melting and gradual cooling and that is formed at least on a part of a surface of a separator base material, i.e., at least on a region of the separator associated with electrical contact resistance between the separator and an adjacent member of the fuel cell when the separator is brought into contact with the adjacent member when the separator is integrated into the fuel cell. Herein, the metal coating layer is formed from a predetermined metal successively subjected to melting and gradual cooling. Therefore, the number of small defects (micro plating-defects as described below) within the metal forming the metal coating layer can be reduced as compared to the case of forming the metal coating layer from a normal plating layer such as electroplating or electroless plating. Moreover, the crystal grain size of the metal forming the metal coating layer is increased as well as the density of grain boundaries, i.e., interfaces between the crystal grains, is reduced. Accordingly, the progress in oxidation and elution of the metal from the grain boundaries can be suppressed. With the oxygen being suppressed, reduction in conductivity of the separator due to oxidation can be suppressed, so that increase in contact resistance of the separator can be suppressed. Moreover, with reduction in grain boundary density, a metal forming the layer on which the metal coating layer is formed (such as separator base material) can be inhibited from being eluted through the grain boundaries of the metal coating layer due to corrosion. Herein, gradual cooling is a process of conducting cooling sufficiently gently. For example, air-cooling is possible as the gradual cooling method. With such sufficiently slow cooling, the crystal grains forming the metal coating layer can be effectively increased in size.

A fuel cell separator according to a second aspect of the invention includes a separator base material, and a metal coating layer formed from a predetermined metal and formed at least on a part of a surface of the separator base material, i.e., at least on a region of the separator associated with electrical contact resistance between the separator and an adjacent member of the fuel cell when the separator is brought into contact with the adjacent member when the separator is integrated into the fuel cell. Crystal grains of the metal forming the metal coating layer have an average grain size of 0.1 mm or more.

In the fuel cell separators according to the first and second aspects of the invention and the methods for manufacturing the fuel cell separator according to the first and second aspects of the invention, the metal coating layer need not be formed directly onto the separator base material, and a different metal layer may further be interposed between the metal coating layer and the separator base material.

Moreover, the gradual cooling may be conducted at such a rate that crystal grains of the metal forming the metal coating layer have an average grain size of 0.1 mm or more.

With such a structure, the metal crystal grains forming the metal coating layer has a sufficiently large average grain size, so that the grain boundary density in the metal coating layer is sufficiently reduced. Therefore, the aforementioned effects resulting from the increased crystal grain size (the effect of suppressing oxidation and elution due to corrosion of the metal forming the metal coating layer itself, and the effect of suppressing elution due to corrosion of the metals forming the underlying layers of the metal coating layer) can be more sufficiently obtained. Note that, herein, the average grain size can be obtained by, for example, image analysis of the crystal grain condition. More specifically, if the crystal grains are not uniform in shape, the average grain size can be obtained by obtaining the diameter of a sphere having the same volume (or a circle having the same area) as that of each crystal grain.

In the first and second fuel cell separators of the invention, the predetermined metal forming the metal coating layer may be a metal having a lower melting point than that of a material of the separator base material.

Note that by using the metal having a lower melting point than that of the material of the separator base material, the metal coating layer can be formed on the separator base material by melting the metal without melting the separator base material.

Note that, in the fuel cell separators according to the first and second aspects of the invention as well as the methods for manufacturing the fuel cell separator according to the first and second aspects of the invention, the metal coating layer may include a plurality of electrically conductive particles.

With such a structure, required electrical conductivity can be ensured by the particles. In other words, increase in contact resistance of the separator resulting from oxidation of the metal coating layer can be effectively suppressed. It is herein desirable that the particles retain sufficient corrosion resistance and electrical conductivity in the internal environment of the fuel cell when the fuel cell is assembled with the fuel cell separator.

Moreover, in the fuel cell separators according to the first and second aspects of the invention as well as the methods for manufacturing the fuel cell separator according to the first and second aspects of the invention, a corrosion-resistant coating layer of a corrosion resistant, electrically conductive substance may be formed on a surface of the metal coating layer.

With such a corrosion-resistant coating layer, oxidation of the metal forming the metal coating layer can be prevented, whereby required electrical conductivity can be ensured. Note that this corrosion-resistant coating layer may be a noble metal coating layer formed from a noble metal, or a ceramic coating layer formed from an electrically conductive ceramics having high corrosion resistance.

In the fuel cell separators according to the first and second aspects of the invention as well as the methods for manufacturing the fuel cell separator according to the first and second aspects of the invention, a carbon coating layer of a carbon material may be formed on the metal coating layer.

With such a structure, a fuel cell separator with further improved corrosion resistance (resistance to metal oxidation and metal elution due to corrosion) can be obtained. As described below, the single cells forming the fuel cell may possibly have strongly acidic internal conditions such as pH 2. However, by forming a fuel cell with the first and second fuel cell separators of the invention or the separators manufactured by the first and second methods for manufacturing the fuel cell separator of the invention as structured above, sufficient corrosion resistance can be realized even in such a harsh environment.

A fuel cell of the invention includes a plurality of single cells stacked on each other, and receives supply of hydrogen-containing fuel gas and oxygen-containing oxidized gas so as to obtain the electromotive force by electrochemical reaction. The fuel cell of the invention further includes a separator provided between the adjacent single cells for preventing a plurality of fluids supplied to the fuel cell including the fuel gas and oxidized gas from being mixed with each other beyond a boundary between the single cells. The separator is the fuel cell separator according to the first and second aspects of the invention.

Such a fuel cell includes the fuel cell separator according to the first or second aspect of the invention. Therefore, the progress in corrosion of the separator as well as increase in resistance of the separator can be prevented from occurring during power-generating operation of the fuel cell. As a result, sufficient performance can be retained for a long time.

BRIEF DESCRIPTION OF THE DRAWINGS

FIG. 8 is an illustration showing the examination result regarding the increase in contact resistance of various separators before and after being subjected to a predetermined treatment;

FIG. 14 is a graphical representation that summarizes embodiments of the invention.

DETAILED DESCRIPTION OF PREFERRED EMBODIMENTS

Figure 1:
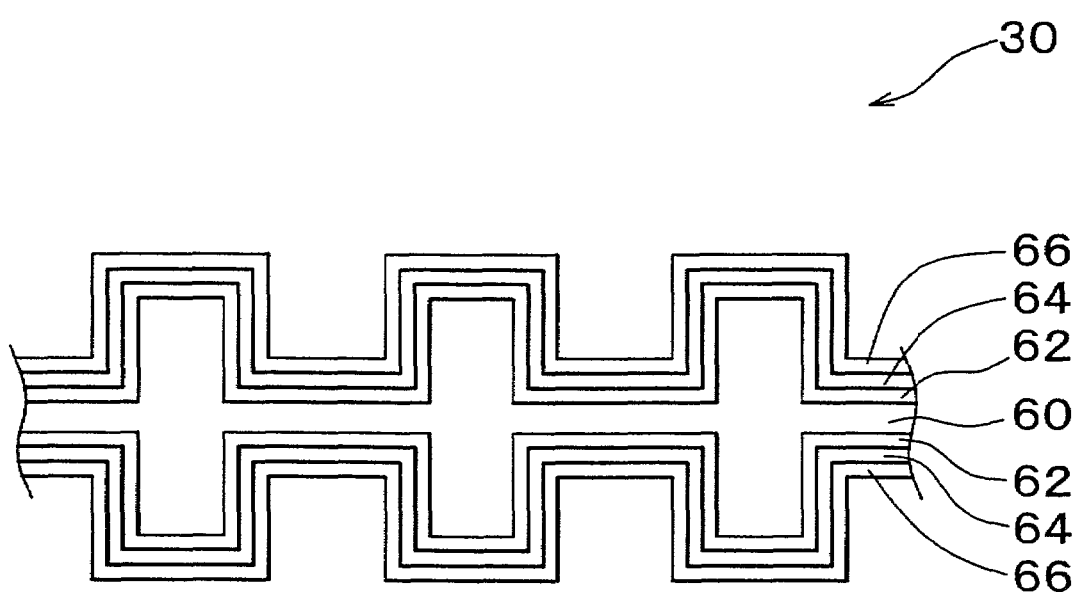
FIG. 1 is an illustration schematically showing the cross-sectional structure of a separator 30 according to one preferred embodiment of the invention.

Hereinafter, embodiments of the invention will be described. FIG. 1 is an illustration schematically showing the cross-sectional structure of a separator 30 according to one preferred embodiment of the invention. The separator 30 according to the first embodiment of the invention is provided with a substrate portion 60 formed from stainless steel, an underlying coating layer 62 formed on the substrate portion 60 from nickel, a metal coating layer 64 formed on the underlying coating layer 62 from a low-melting-point metal containing tin, and a carbon coating layer 66 formed on the metal coating layer 64 from a member containing carbon materials. The separator 30 of this embodiment is characterized in that the metal coating layer 64 is formed from a low-melting-point metal subjected to a melting process. A fuel cell formed with the separator 30 will be explained first prior to giving of the detailed description of the separator 30.

Figure 2:
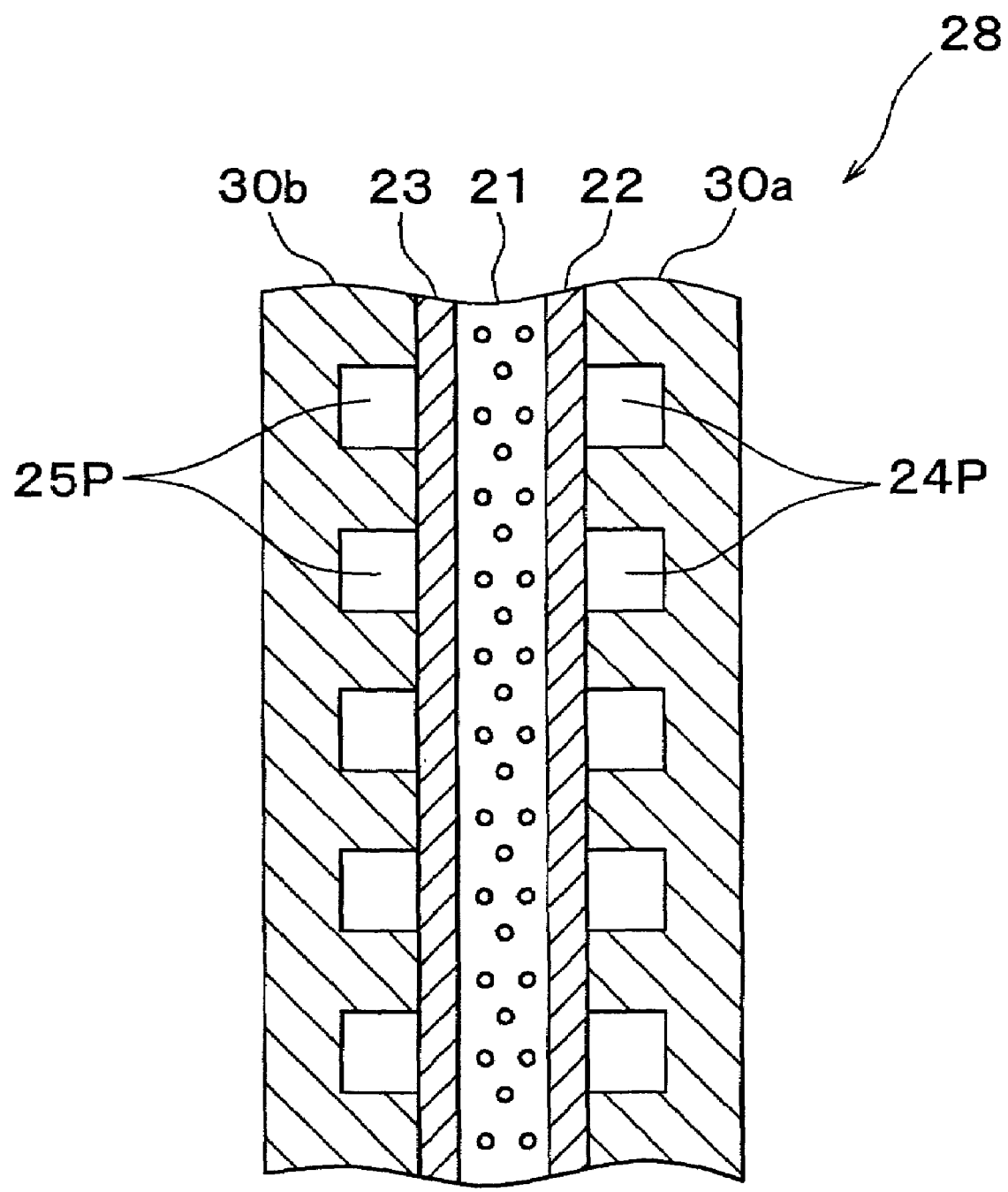
FIG. 2 is an exemplary cross-sectional view showing the structure of a single cell 28.
Figure 3:
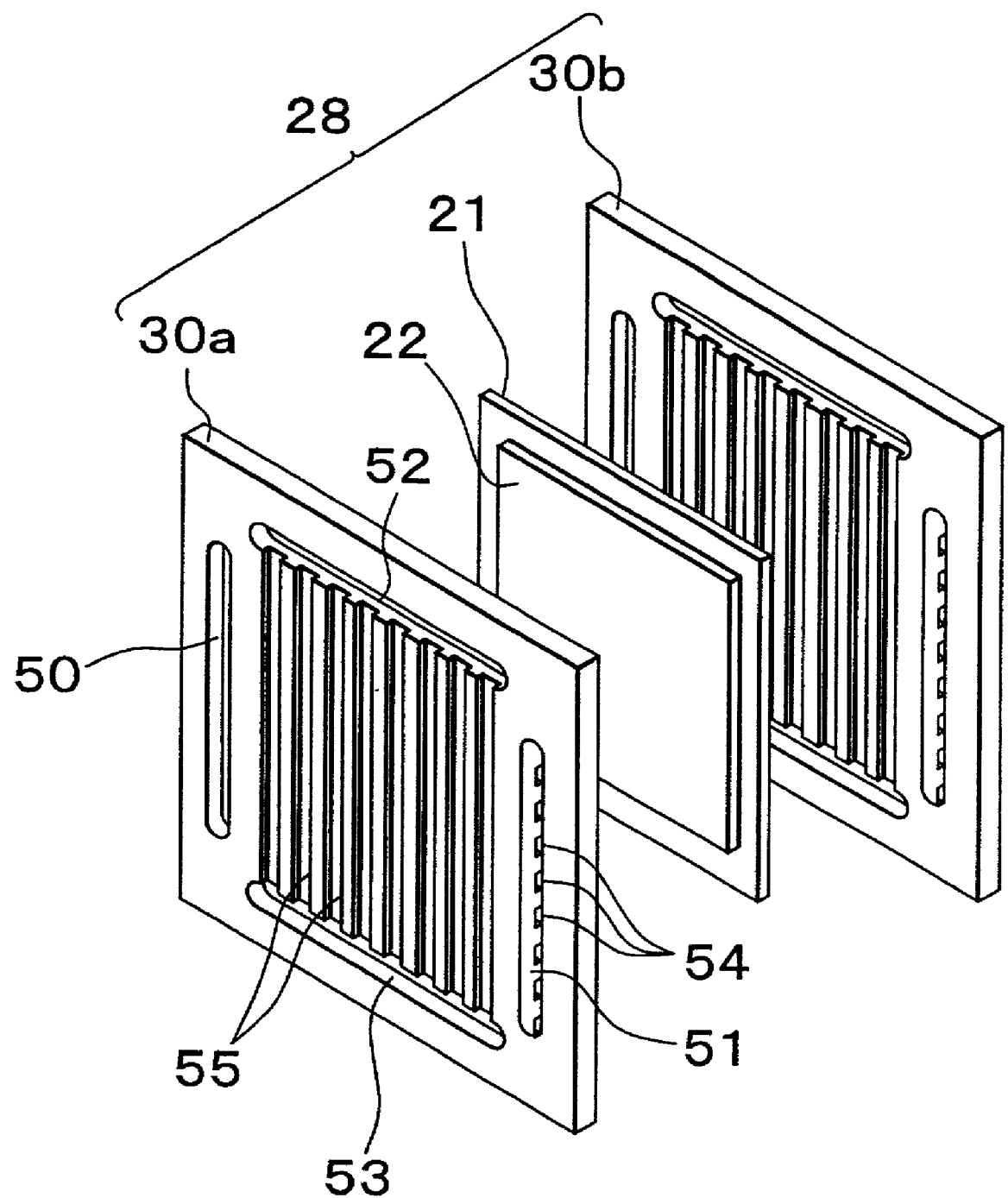
FIG. 3 is an exploded perspective view showing the structure of the single cell 28.
Figure 4:
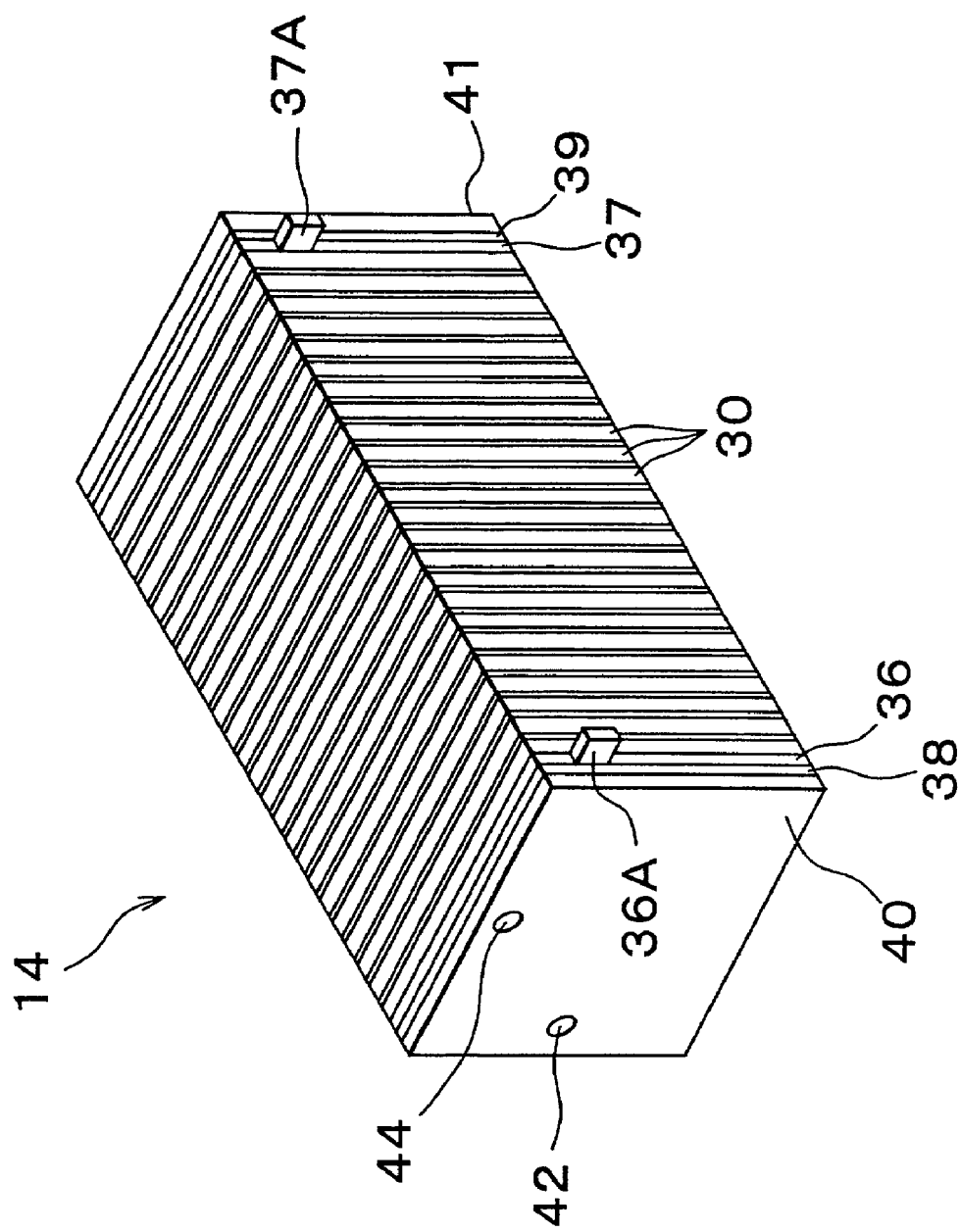
FIG. 4 is a perspective view showing the external appearance of a stacked structure 14.

(1) Fuel Cell Structure:

The fuel cell formed with the separator 30 according to the first embodiment of the invention has a stacked structure of a plurality of single cells (constituent units) stacked on each other. FIG. 2 is a schematic cross-sectional view exemplifying the structure of a single cell 28, i.e., a constituent unit of the fuel cell. FIG. 3 is an exploded perspective view showing the structure of the single cell 28. FIG. 4 is a perspective view showing the external appearance of the stacked structure 14 having the single cells 28 stacked on each other.

The fuel cell of this embodiment is a polymer electrolyte fuel cell. The polymer electrolyte fuel cell includes a solid polymer membrane exhibiting excellent electrical conductivity (ionic conductivity) as an electrolyte layer in the wet condition. Such a fuel cell receives hydrogen-containing fuel gas supply at its anode, and also receives oxygen-containing oxidized gas supply at its cathode, thereby causing the electrochemical reaction as given by the following formulas:

$$H_2 \rightarrow 2H^+ + 2e^- \quad (1)$$

$$(1/2)O_2 + 2H^+ + 2e^- \rightarrow H_2O \quad (2)$$

$$H_2 + (1/2)O_2 \rightarrow H_2O \quad (3)$$

Formula (1) is a reaction at the anode, formula (2) is a reaction at the cathode, and the reaction as given by formula (3) proceeds in the entire fuel cell. Thus, the fuel cell converts the chemical energy of the fuel supplied thereto directly into the electrical energy. The fuel cell is known as a highly energy-efficient apparatus. As shown in FIG. 2, the single cell 28, i.e., a constituent unit of the fuel cell, is composed of an electrolyte membrane 21, anode 22 and cathode 23, and separators 30a, 30b.

The anode 22 and cathode 23 are gas diffusion electrodes that interpose the electrolyte membrane 21 therebetween so as to form a sandwich structure. The separators 30a, 30b further interpose the sandwich structure therebetween so as to form the flow paths of the fuel gas and oxidized gas between the respective separator 30a, 30b and the anode 22 and cathode 23. Fuel gas flow paths 24P are formed between the anode 22 and the separator 30a, and oxidized gas flow paths 25P are formed between the cathode 23 and the separator 30b. The fuel cell is actually assembled with a predetermined number of single cells 28 stacked on each other to form the stacked structure 14.

In FIG. 2, ribs for forming the gas flow paths are shown to be formed at only one surface of each separator 30a, 30b. In the actual fuel cell, however, each separator 30a, 30b has ribs 54 and 55 at both surfaces, as shown in FIG. 3. The ribs 54 formed at one surface of each separator 30a, 30b form the fuel gas flow paths 24P together with the adjacent anode 22. The ribs 55 formed at the other surface of each separator 30a, 30b form the oxidized gas flow paths 25P together with the adjacent cathode 23 included in the single cell. Accordingly, the separators 30a, 30b not only serve to form the gas flow paths together with the respective gas diffusion electrodes, but to separate the fuel gas flow from the oxidized gas flow between the adjacent single cells. Thus, in the actually assembled fuel cell, the separators 30a, 30b are not distinguished from each other in terms of their forms or functions. Therefore, the separators 30a, 30b are hereinafter collectively referred to as separator 30.

Note that the ribs 54, 55 formed at the surfaces of each separator need only have such a shape that forms the gas flow paths so as to enable the fuel gas or oxidized gas to be supplied to the respective gas diffusion electrodes. In this embodiment, a plurality of groove-like structures extending in parallel are formed as the ribs 54, 55 at the surfaces of each separator. In FIG. 2, the fuel gas flow paths 24P are shown to extend in parallel with the oxidized gas flow paths 25P in order to schematically show the structure of the single cell 28. However, in the separators 30 actually used for assembling the fuel cell, the ribs 54, 55 are respectively formed at both surfaces of each separator 30 such that the ribs 54 extend in the direction perpendicular to that of the ribs 55.

The electrolyte membrane 21 is a proton-conductive ion exchange membrane formed from a solid polymer material, e.g., fluororesin, and exhibits excellent electrical conductivity in the wet condition. A Nafion membrane (made by DUPONT) was used in this embodiment. Platinum or an alloy of platinum and another metal is applied as a catalyst to the surface of the electrolyte membrane 21.

The anode 22 and cathode 23 are both formed from a woven carbon cloth of carbon fiber threads. Note that, in this embodiment, the anode 22 and cathode 24 are formed from a carbon cloth. However, it is also preferable to form the anode 22 and cathode 24 from a carbon paper or carbon felt formed from carbon fiber.

As described above, the separator 30 has three coating layers on the metal substrate portion 60. The separator 30 has four hole structures in its peripheral portion, i.e., fuel gas holes 50, 51 for connecting the ribs 54 forming the fuel gas flow paths 24P to each other, and oxidized gas holes 52, 53 for connecting the ribs 55 forming the oxidized gas flow paths 25P to each other. In the assembled fuel cell, the fuel gas holes 50, 51 of each separator 30 respectively form a fuel gas supply manifold and a fuel gas exhaust manifold, which internally extend through the fuel cell in the stacking direction. Similarly, the oxidized gas holes 52, 53 of each separator 30 respectively form an oxidized gas supply manifold and an oxidized gas exhaust manifold, which also internally extend through the fuel cell in the stacking direction.

The fuel cell provided with the aforementioned members is assembled by sequentially laminating the separator 30, anode 22, electrolyte membrane 21, cathode 23 and separator 30 in this order, and placing current collector plates 36, 37, insulating plates 38, 39 and end plates 40, 41 onto both ends of the resultant lamination, respectively, thereby completing the stacked structure 14 shown in FIG. 4. The current collector plates 36, 37 are respectively provided with output terminals 36A, 37A capable of outputting the electromotive force produced in the fuel cell.

The end plate 40 has two hole structures as shown in FIG. 4, one is a fuel gas supply hole 42, and the other is an oxidized gas supply hole 44. The insulating plate 38 and current collector plate 36 that are adjacent to the end plate 40 each has similar two hole structures at the positions corresponding to the two hole structures of the end plate 40. The fuel gas supply hole 42 is formed at the center of the fuel gas hole 50 of the separator 30. Note that the fuel cell is operated with the fuel gas supply hole 42 being connected to a not-shown fuel supply apparatus, so that hydrogen-rich fuel gas is supplied into the fuel cell. Similarly, the oxidized gas supply hole 44 is formed at the position corresponding to the center of the oxidized gas hole 52 of the separator 30. The fuel cell is operated with the oxidized gas supply hole 44 being connected to a not-shown oxidized gas supply apparatus, so that oxygen-containing oxidized gas is supplied into the fuel cell. The fuel gas supply apparatus and oxidized gas supply apparatus are apparatuses for supplying the respective gas humidified and pressurized by a predetermined amount into the fuel cell.

The end plate 41 has two hole structures, i.e., a fuel gas exhaust hole and an oxidized gas exhaust hole (both not shown), at the positions different from those of the end plate 40. The insulating plate 39 and current collector plate 37 each has two hole structures at the same positions as those of the end plate 41. One of the hole structures of the end plate 41, i.e., the fuel gas exhaust hole, is formed at the position corresponding to the center of the fuel gas hole 51 of the separator 30. The other hole structure, i.e., the oxidized gas exhaust hole, is formed at the position corresponding to the center of the oxidized gas hole 53 of the separator 30. The fuel cell is operated with a not-shown fuel gas exhaust apparatus being connected to the fuel gas exhaust hole and a not-shown oxidized gas exhaust apparatus being connected to the oxidized gas exhaust hole. As described above, the fuel gas flow paths 24P serving as the flow paths within the single cells, the fuel gas supply manifold and the fuel gas exhaust manifold are formed within the fuel cell. These flow paths communicate with each other within the fuel cell such that the fuel gas can flow from the fuel gas supply hole 42 to the fuel gas exhaust hole. Moreover, as described above, the oxidized gas flow paths 25P serving as the flow paths within the single cells, the oxidized gas supply manifold and the oxidized gas exhaust manifold are formed within the fuel cell. These flow paths communicate with each other within the fuel cell such that the oxidized gas can flow from the oxidized gas supply hole 44 to the oxidized gas exhaust hole.

The stacked structure 14 formed from the aforementioned members is held with predetermined pressing force applied in the staking direction. Thus, the fuel cell is completed. The structure for pressing the stacked structure 14 is not shown herein.

Hereinafter, the respective flow of the fuel gas and oxidized gas within the fuel cell having the aforementioned structure will be described. The fuel gas is introduced from the aforementioned predetermined fuel gas supply apparatus into the fuel cell through the fuel gas supply hole 42 formed in the end plate 40. Within the fuel cell, the fuel gas is supplied to the fuel gas flow paths 24P of each single cell 28 through the fuel gas supply manifold and provided for the electrochemical reaction proceeding at the anode of each single cell 28. The fuel gas discharged from the fuel gas flow paths 24P is collected at the fuel gas exhaust manifold and reaches the fuel gas exhaust hole of the end plate 41, from which the fuel gas is discharged to the outside of the fuel cell into the predetermined fuel gas exhaust apparatus.

Similarly, the oxidized gas is introduced from the aforementioned predetermined oxidized gas supply apparatus into the fuel cell through the oxidized gas supply hole 44 formed in the end plate 40. Within the fuel cell, the oxidized gas is supplied to the oxidized gas flow paths 25P of each single cell 28 through the oxidized gas supply manifold and provided for the electrochemical reaction proceeding at the cathode of each single cell 28. The oxidized gas discharged from the oxidized gas flow paths 25P is collected at the oxidized gas exhaust manifold and reaches the oxidized gas exhaust hole of the end plate 41, from which the oxidized gas is discharged into the predetermined oxidized gas exhaust apparatus.

Figure 5:
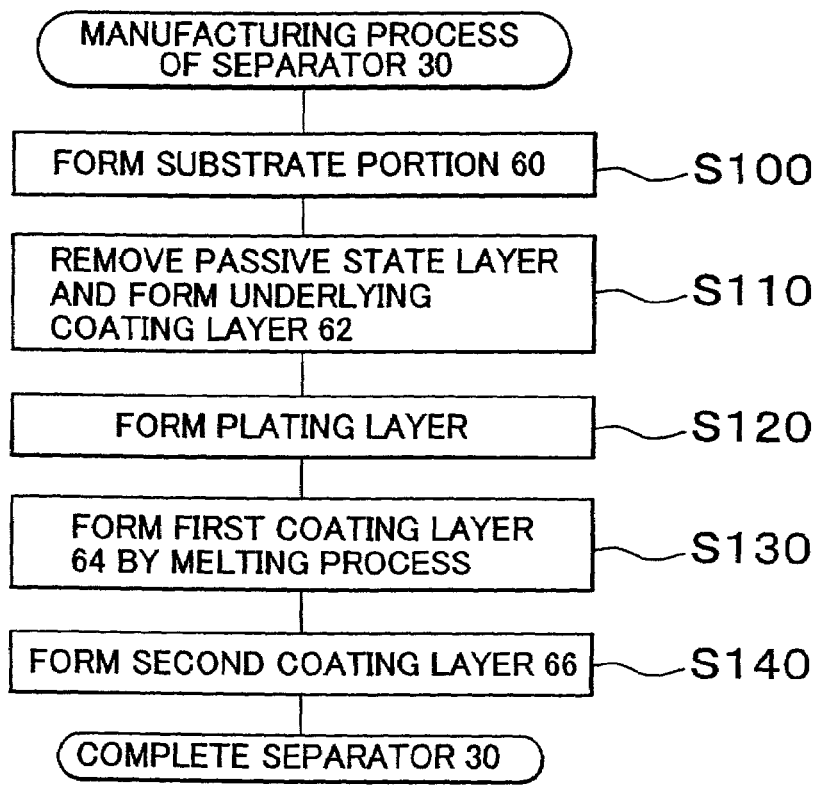
FIG. 5 is an illustration showing a manufacturing process of the separator 30.

(2) Structure of Separator 30:

Hereinafter, the structure of the separator 30 provided in the fuel cell will be described. As described above, the separator 30 is composed of the substrate portion 60, underlying coating layer 62, metal coating layer 64, and carbon coating layer 66. FIG. 5 is an illustration showing the manufacturing process of the separator 30.

In manufacturing the separator 30, a thin stainless steel sheet is first mechanically pressed to form the substrate portion 60 having a predetermined concave-convex shape at both surfaces thereof (Step S100). The concave-convex shape formed at both surfaces of the separator 30 by the pressing is such a shape that can form the aforementioned fuel gas flow paths 24P and oxidized gas flow paths 25P in the fuel cell integrating the separators 30 therein. A stretch-formed or bent stainless steel sheet, a half-sheared stainless steel sheet (i.e., a partially blanked stainless steel sheet) or the like can be used as the substrate portion 60 formed from a stainless steel sheet mechanically pressed into the predetermined concave-convex shape in Step S100.

Then, the substrate portion 60 obtained in Step S100 is subjected to surface treatment in order to remove a passive state layer formed at the surface of the stainless steel forming the substrate portion 60 and to form the underlying coating layer 62 on the substrate portion 60 having the passive state layer removed therefrom (Step S110). Stainless steel has a non-conductive passive state layer at its surface. The underlying coating layer 62 is thus formed after removing the passive state layer in order to prevent reduction in electrical conductivity of the separator 30 (i.e., increase in contact resistance with the metal coating layer 64 further formed on the substrate portion 60) due to such a passive state layer formed at the stainless steel surface. The underlying coating layer 62 was formed from nickel in this embodiment. However, the underlying coating layer 62 may be formed from any metal as long as the metal can be formed on the substrate portion 60 and has a melting point that is sufficiently higher than that of the metal forming the metal coating layer 64 as described below. For example, a metal having a smaller ionization tendency such as copper may be used. Note that the underlying coating layer 62 can be formed either by electroplating or electroless plating. In this embodiment, the underlying coating layer 62 was formed with a thickness of 10 μm.

After the underlying coating layer 62 is formed, an alloy-plating layer of tin and bismuth is formed on the surface thereof (Step S120). This alloy-plating layer can also be easily formed by a method such as electroplating or electroless plating, and it was formed by electroplating in this embodiment. In this embodiment, this plating layer was formed with a thickness of 10 μM.

Then, the plating layer formed on the substrate portion 60 having the underlying coating layer 62 thereon is subjected to a melting process (Step S130). The alloy of tin and bismuth forming the plating layer is a low-melting-point metal. By heating to an appropriate temperature, only the metal forming the plating layer can be melted without affecting the underlying coating layer 62 and the substrate portion 60. The melting temperature of tin is 230° C., and the melting temperature of the alloy varies depending on the proportion of tin and bismuth in the alloy. The heating need only be conducted at such a temperature that sufficiently liquefies the low-melting-point metal forming the plating layer.

In the melting process of Step S130, after the low-melting-point metal forming the plating layer is melted, the molten metal is cooled. In this embodiment, the molten metal was air-cooled. More specifically, the substrate portion 60 having the plating layer melted by heating was left in the air so as to be cooled slowly at room temperature. The molten metal is solidified to form crystal grains. Such slow cooling (gradual cooling) enables the metal coating layer resulting from solidification of the molten metal to have larger metal crystal grains. In this embodiment, air-cooling was conducted to obtain an average grain size of 0.1 mm or more. Air-cooling is herein described as the slow cooling (gradual cooling) method. However, any method can be used as long as the crystal grains can be grown sufficiently. Sufficient, slow cooling would allow the crystal grains having an average grain size of 1 mm or more to be grown. With such a melting process including both heating and cooling, the alloy-plating layer of tin and bismuth formed in Step 120 is changed into the metal coating layer 64 having large crystal grains.

Note that this melting process is desirably conducted under the atmosphere capable of sufficiently preventing oxidation. An example of a convenient method is as follows: the plating layer is immersed and melted in oil at a temperature capable of melting the plating layer, and thereafter is removed from the oil and air-cooled to solidify the molten metal. The oil as used herein is such oil that is less likely to be decomposed at the aforementioned temperature capable of melting the plating layer. For example, soldering oil for solder can be used.

After the metal coating layer 64 is formed, the carbon coating layer 66 formed from a member containing carbon materials is further formed on the surface thereof (Step S140). Thus, the separator 30 is completed. The carbon coating layer 66 contains graphite particles and carbon black as the carbon materials, and is formed from the carbon materials mixed with a binder. Examples of the graphite as used herein include artificial graphite, crystalline graphite, flake graphite, earthy graphite and the like. Examples of the carbon black as used herein include channel black, furnace black, acetylene black, ketjenblack and the like. For example, a resin-based material or rubber-based material that is stable enough in the internal environment of the fuel cell (under acidic conditions or at a predetermined high temperature) may be used as the binder. Examples of the resin-based material include fluororesin, acrylic resin, polyester resin, urethane resin, phenol resin, phenol epoxy resin, and the like. Examples of the rubber-based material include styrene-butadiene rubber (SBR), isobutylene-isoprene rubber (IIR), ethylene-propylene rubber (EPDM), fluororubber, nitrile rubber (NBR), chloropropylene rubber (CR) and the like. One of these resin-based materials and rubber-based materials, or combination of a plurality of these resin-based materials and rubber-based materials may be used as the binder. The carbon coating layer 66 may be formed by immersing the substrate portion 60 having the underlying coating layer 62 and metal coating layer 64 formed thereon into the mixture of the carbon materials and melted binder, or by spraying this mixture onto the metal coating layer 64. Alternatively, the mixture may be applied by curtain flow coating. Note that, in this embodiment, the carbon coating layer 66 was formed with a thickness of 40 μm.

Note that, in the foregoing description, the substrate portion 60 is press-formed to have a concave-convex shape for forming fuel gas flow paths 24P and oxidized gas flow paths 25P at the respective surfaces thereof. However, the substrate portion 60 may have another structure. For example, the substrate portion 60 may alternatively be formed from two thin plates laminated to each other, one of the thin plates having a concave-convex shape for forming the fuel gas flow paths 24P on its one surface, and the other having a concave-convex shape for forming the oxidized gas flow paths 25P on its one surface.

According to the separator 30 structured as such, the metal coating layer 64 formed from the low-melting-point metal subjected to the melting process covers the stainless-steel substrate portion 60, and the carbon coating layer 66 containing carbon materials is further formed on the surface thereof. As a result, a highly corrosion-resistant, highly conductive fuel cell separator can be obtained. Moreover, with such a separator 30, a highly durable fuel cell having sufficient cell performance can be obtained.

As described below, the fuel cell has a strongly acidic internal environment during its power-generating operation. In such an environment, even if a coating layer containing carbon materials like the carbon coating layer 66 of the separator 30 of this embodiment is formed on the surface of the separator so as to protect the inner metal layers covered therewith, the metal layers under the coating layer (in this embodiment, the metal coating layer 64, underlying coating layer 62 and substrate portion 60) may possibly be subjected to gradual corrosion (including both elution of ionized metal and formation of a passive state layer as a result of oxidation of the metal due to corrosion).

If the ionized metal is eluted by corrosion even in a slight amount, the metal ions are introduced into a solid polymer electrolyte membrane. As a result, the metal ions are attracted to the ion exchange groups (sulfonates) included in the electrolyte membrane, thereby degrading the proton conductivity of the solid polymer electrolyte membrane. This is not desirable for maintaining the performance of the fuel cell. Moreover, since, in general, the passive state layer is not electrically conductive or is not electrically conductive enough, formation of such a passive state layer causes reduction in electrical conductivity of the separator (increase in contact resistance).

In the separator 30 of this embodiment, the metal coating layer 64 under the carbon coating layer 66 is formed from the low-melting-point metal subjected to the melting process. As a result, corrosion of the metal coating layer 64 itself as well as the underlying coating layer 62 and substrate portion 60 located thereunder can be sufficiently suppressed. Moreover, in this embodiment, an alloy of tin and bismuth rather than only tin is used as the low-melting-point metal of the metal coating layer 64. Therefore, corrosion resistance (resistance to elution and oxidation) can be improved. The relation between the metal coating layer 64 subjected to the melting process and corrosion resistance will be described in further detail below.

Functions of the carbon coating layer 66 will now be described specifically. As described above, the carbon coating layer 66 is formed from the carbon materials bound with the binder, and prevents the surface of the metal coating layer 64 from being directly exposed to the internal environment of the fuel cell. More specifically, the internal environment of the fuel cell tends to become strongly acidic gradually during its power-generating operation. However, the carbon coating layer 66 provided on the metal coating layer 64 produces a sufficient proton concentration gradient between the surface of the metal coating layer 64 and the surface of the separator 30 (the surface of the carbon coating layer 66). Therefore, even if the environment surrounding the separator 30 becomes pH 2, the surface of the metal coating layer 64 coated with the carbon coating layer 66 is subjected to a much less acidic environment (pH closer to neutral). Accordingly, corrosion resistance can be more sufficiently ensured.

The internal environment of the fuel cell is considered to be acidified mainly due to the following two factors: in the fuel cell (e.g., polymer electrolyte fuel cell), a catalyst layer including platinum, a platinum alloy or the like is provided on the surface of the electrolyte membrane. This catalyst layer normally contains a residual sulfate or the like of platinum that is used as a material for forming the catalyst layer. Accordingly, when the fuel cell is started, the residual platinum salt is eluted into the water produced in the gas flow paths in the fuel cell, thereby acidifying the internal environment of the fuel cell. Moreover, the solid polymer electrolyte membrane provided in the polymer electrolyte fuel cell includes sulfonates as a functional group for realizing the proton conductivity. This solid polymer electrolyte membrane is gradually decomposed little by little at the portions of the sulfonates during power-generating operation of the fuel cell, thereby producing sulfuric acid. Thus, the internal environment of the fuel cell is acidified. It is said that such platinum-salt elution and sulfonate decomposition acidify the internal environment of the fuel cell to about pH 2.

Note that the carbon materials forming the carbon coating layer 66 have a property of causing a minute amount of water to gradually penetrate therein. Moreover, a minute amount of water may also gradually penetrate through the interface between the binder and the carbon materials. Therefore, such a gradually penetrating minute amount of water may possibly corrode the underlying layer over the long-time use of the fuel cell integrating the separators. In the separator 30 of this embodiment, however, the underlying metal coating layer 64 is formed from the low-melting-point metal subjected to the melting process, as described above. Therefore, improved corrosion resistance can be assured in the metal coating layer 64, and also corrosion of the layers under the metal coating layer 64 can be sufficiently suppressed. The carbon coating layer 66 formed from the carbon materials and binder also has sufficient corrosion resistance. Therefore, the separator 30 exhibits high corrosion resistance as a whole, whereby a sufficiently durable fuel cell can be obtained using the separator 30.

Note that, in addition to the aforementioned effect of sufficiently suppressing the progress in corrosion of the metal coating layer 64, the carbon coating layer 66 containing the carbon materials has an effect of preventing, even if a slight amount of metal ions is eluted through the surface of the metal coating layer 64 from the inner layers including the metal coating layer 64 due to corrosion over the longtime power-generating operation of the fuel cell, the eluted metal ions from being discharged to the outside of the separator through the carbon coating layer 66. Thus, by forming the metal coating layer 64 from the low-melting-point metal subjected to the melting process, and further forming the carbon coating layer 66 containing the carbon materials over the metal coating layer 64, the progress in corrosion of the separator (a metal portion forming the separator) can be suppressed, as well as the problems caused by a slight amount of metal ions can also be suppressed. As a result, a highly durable fuel cell can be obtained with such a separator 30.

Moreover, according to the separator 30 of this embodiment, a noble metal is not used to ensure the corrosion resistance and electrical conductivity of the separator. Therefore, the manufacturing cost of the separator can be suppressed. Accordingly, excessive increase in the overall cost of the fuel cell using such a separator can be suppressed.

By forming the separator without using any noble metal, the effect of suppressing the progress in corrosion in the lower layers such as the substrate portion of the separator can further be improved. In the case where metals having different ionization tendencies are present with a potential difference therebetween, a cell is formed between these metals. As a result, the metal having a larger ionization tendency is corroded to a larger degree. In the case where the coating layer of the low-melting-point metal that is a base metal (metal coating layer 64) is formed on the substrate portion as in this embodiment, the difference in ionization tendency between the substrate portion and the coating layer is reduced as compared to the case where a noble metal coating layer is formed on the substrate portion. Accordingly, the aforementioned disadvantage resulting from the difference in ionization tendency can be suppressed.

Furthermore, in the separator 30 of this embodiment, the underlying coating layer 62 is formed between the metal coating layer 64 and the substrate portion 60. Therefore, the effect of suppressing elution of the metal forming the substrate portion 60 due to corrosion can further be improved. Normally, a plating layer formed by plating has pinholes (small holes) (hereinafter, referred to as micro plating-defects). A layer located under the plating layer may possibly be subjected to corrosion through these micro plating-defects. In this embodiment, the low-melting-point metal is subjected to the melting process in order to reduce the number of micro plating-defects in the metal coating layer 64 as described below. In addition, the underlying coating layer 62 is formed under the metal coating layer 64 in order to improve the effect of protecting the substrate portion 60 as well as to ensure sufficient overall corrosion resistance of the separator 30. It should be appreciated that, if the substrate portion 60 can be sufficiently protected by the carbon coating layer 66 and the metal coating layer 64, the underlying coating layer 62 may be eliminated so that the plating layer of the tin-bismuth alloy may be directly formed on the substrate portion 60.

In the separator 30 of this embodiment, the substrate portion 60 is formed from stainless steel. However, the substrate portion 60 may alternatively be formed from another metal having excellent electrical conductivity and formability such as aluminum or titanium.

Figure 6:
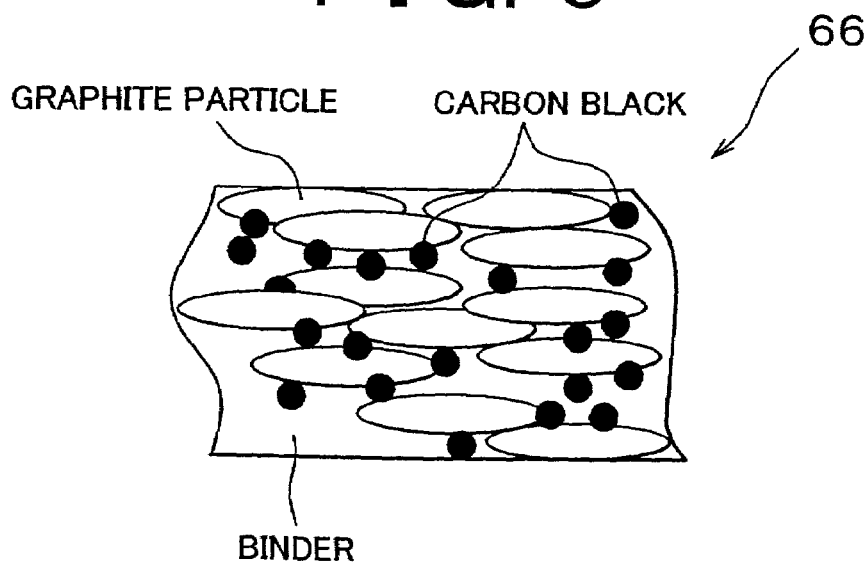
FIG. 6 is an illustration schematically showing the structure of a carbon coating layer 66.

FIG. 6 is an illustration schematically showing the structure of the carbon coating layer 66 containing the carbon materials. As shown in FIG. 6, the carbon coating layer 66 is formed from graphite particles having carbon black particles of smaller size therebetween. Sufficient overall electrical conductivity of the carbon coating layer 66 is ensured by the carbon materials connected and stacked on each other across the thickness direction of the carbon coating layer 66. The binder for binding the carbon materials is highly corrosion resistant, and fills the space between the carbon material particles so as to prevent the water from penetrating through the space between the carbon particles. Thus, with a sufficient amount of binder, the amount of water reaching the metal coating layer 64 can be sufficiently reduced, whereby the overall corrosion resistance of the separator 30 can be improved. Accordingly, the respective amounts of carbon materials and binder contained in the carbon coating layer 66 may be selected as appropriate within the range that is capable of ensuring sufficient overall electrical conductivity of the carbon coating layer 66.

Note that, in the separator 30, sufficient electrical conductivity need only be ensured in a region that is in contact with an adjacent member within the fuel cell. Accordingly, the carbon coating layer 66 need only have a sufficient amount of carbon materials at least in the region that is in contact with the adjacent member, and does not necessarily have a sufficient amount of carbon materials in the other regions. In a region that is not associated with the electrical conductivity of the separator, a sufficient amount of binder need only be provided, whereby the underlying metal layer can be protected as well as corrosion thereof can be suppressed. The carbon coating layer 66 containing the carbon materials may be formed without using the binder as long as its capability of shielding and protecting the underlying layer from the environment outside the separator can be sufficiently ensured. For example, thermal expansion graphite is a well-known carbon material having a layer structure, and can be bound together only by pressing without using the binder. Provided that the amount of water penetrating through the pressed thermal expansion graphite layer is within the allowable range, the carbon coating layer 66 may be formed from the thermal expansion graphite pressed without using the binder.

(3) Structure of Metal Coating Layer 64:

Hereinafter, the effect of conducting the melting process to the low-melting-point metal like the metal coating layer 64 of this embodiment will be described. This embodiment is characterized in that the low-melting-point metal is subjected to the melting process so as to change the state of the metal crystal grains in the low-melting-point metal layer and the state of the grain boundaries between the crystal grains. The low-melting-point metal is a metal having a lower melting point than the other metals, and generally refers to a metal having a melting point of 500° C. or less. Examples of such a low-melting-point metal include zinc (Zn; melting point: 419.5° C.), lead (Pb; melting point: 327° C.), tin (Sn; melting point: 232° C.), bismuth (Bi; melting point: 271.4° C.), and cadmium (Cd; melting point: 320.8° C.). However, the low-melting-point metal as used in the present application refers to a metal having a lower melting point than the metal forming the substrate portion 60 and capable of being subjected to the aforementioned melting process. Moreover, a low-melting-point alloy of metals having a low melting point and capable of being subjected to such a melting process is also herein referred to as the low-melting-point metal.

Figure 7A:
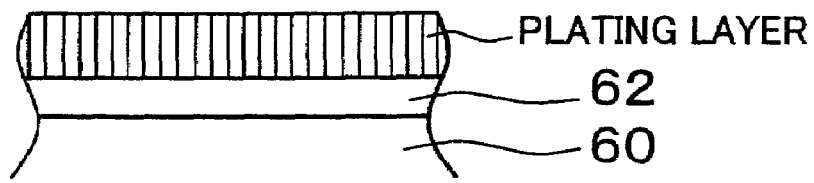
FIG. 7 shows the process of manufacturing the separator 30.

FIG. 7 shows the state where the separator is manufactured according to the manufacturing process of the separator 30 as shown in FIG. 5. FIG. 7A shows the state where a plating layer of a tin-bismuth alloy has been formed on the underlying coating layer 62. A metal is generally polycrystalline. However, when the plating layer is formed over the substrate portion 60, the crystal grains of the metal forming the plating layer become columnar crystal grains. The vertical hatching of FIG. 7A represents the state where the plating layer of the columnar crystal is formed.

Figure 7B:
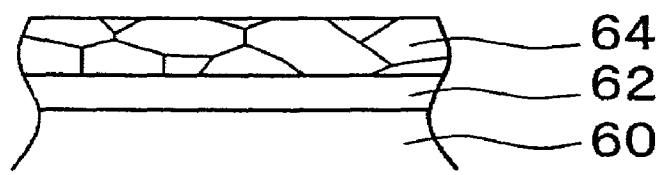
Figure 7C:
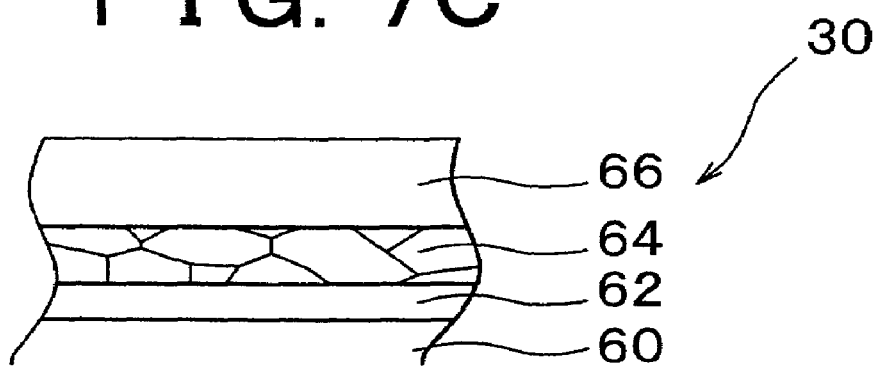

When the substrate portion 60 having such a plating layer formed thereon is heated at a temperature higher than the melting point of the low-melting-point metal of the plating layer, only the low-melting-point metal of the plating layer is melted over the substrate portion 60. The low-melting-point metal is melted into a liquid metal while destroying its columnar crystal structure. The liquid metal is solidified back into a polycrystalline metal by the subsequent cooling operation, as shown in FIG. 7B. FIG. 7C shows the state at the surface of the completed separator 30.

In the melting process including the heating and cooling steps, the cooling rate for solidifying the molten metal determines the crystal grain size of the resulting polycrystalline metal of the metal coating layer 64. As the cooling rate is decreased, the resulting crystal grain size is increased. Therefore, such slow cooling in the air as conducted in this embodiment allows an increased crystal grain size. Air-cooling is exemplary only, and another cooling method such as strict temperature control in a predetermined thermostat may be used. If the cooling rate is low enough, such a melting process composed of the heating and cooling steps as described above can change a plating layer formed from crystal grains having a grain size of several micrometers to several tens of micrometers into a metal layer formed from crystal grains having a larger grain size, e.g., a grain size of 1 mm or more. Note that if the molten thin-film metal is re-solidified as such, the resulting metal crystal is mainly the isometric crystal. The isometric crystal as used herein refers to the crystal in which three axes of equal length cross orthogonal to each other.

As described above, the metal coating layer 64 may possibly be oxidized with the water or oxygen penetrating through the carbon coating layer 66. The oxidation of the metal coating layer 64 proceeds from the grain boundaries between the metal crystal grains of the metal coating layer 64. In other words, the grain boundaries where the continuous metal crystal structure is disconnected are more reactive (more likely to react with another element) and thus are more likely to be oxidized as compared to the inside of the crystal grains where the metal elements are regularly arranged and bonded together. Accordingly, like the metal coating layer 64 of the separator 30 of this embodiment, by increasing the crystal grain size of the low-melting-point metal with the melting process, the density of grain boundaries that are likely to be oxidized can be reduced, whereby oxidation resistance of the metal coating layer 64 can be improved. Thus, by suppressing the progress in oxidation with a reduced grain boundary density, reduction in overall electrical conductivity of the separator 30 can be suppressed, and thus, increase in internal resistance of the fuel cell resulting from such reduction in electrical conductivity can be suppressed.

In addition to the aforementioned effect of suppressing reduction in electrical conductivity resulting from oxidation proceeding in the metal coating layer 64, the increased crystal grain size and reduced grain boundary density as a result of the melting process of the low-melting-point metal can achieve the effect of suppressing elution of the metal ions produced by corrosion of the metals forming the separator 30. In other words, metal corrosion also proceeds from a more-reactive portion. However, since the density of the more-reactive grain boundaries is reduced as described above, the progress in corrosion of the metal coating layer 64 can be suppressed. Moreover, the water and oxygen penetrating through the carbon coating layer 66 may penetrate further into the separator through the grain boundaries within the metal coating layer 64. However, the reduced grain boundary density can suppress corrosion of the underlying coating layer 62 and the substrate portion 60 by the water and oxygen penetrating through the metal coating layer 64, and thus can suppress elution of the metals forming the underlying coating layer 62 and the substrate portion 60 resulting from such corrosion.

In addition to the aforementioned effects obtained by the increased crystal grain size and reduced grain boundary density of the metal forming the metal coating layer 64, the melting process of the low-melting-point metal layer has an effect of changing the property of the grain boundaries so that the crystal grains are packed more closely. In other words, during cooling of the molten liquid metal, the bonding between atoms is merely strengthened in the liquid metal containing no foreign matter like water. Therefore, the crystal grains are packed very closely. However, in the metal layer formed by plating, the boundary surfaces are formed at places where the crystal grains independently grown in the plating bath encounter each other. Therefore, there is a plating solution between the crystal grains until they are in contact with each other. Accordingly, the crystal grains resulting from the molten metal are packed more closely than those produced in the plating bath. Thus, the melting process enables the crystal grains to be packed more closely. Such a more closely packed state of the boundaries between the crystal grains reduces the number of micro plating-defects described above, whereby corrosion of the lower layers (underlying coating layer 62 and substrate portion 60) through the grain boundaries can be suppressed.

Note that, in the separator 30 of this embodiment, the tin-bismuth alloy was used as the low-melting-point metal forming the metal coating layer 64. The tin-bismuth alloy forms a eutectic while being solidified in the melting process. By using these elements together, the melting point can be reduced as compared to the case of using them separately. The eutectic as used herein has such a structure that two or more solid phases produced from a single solution during cooling are closely mixed together. It is thus desirable that the low-melting-point metal of the metal coating layer 64 is formed from a plurality of elements that together reduce the meting point further as compared to the case of using them separately. A system capable of achieving such an effect is not limited to the combination of tin and bismuth. For example, any combination of two or more elements of tin, bismuth and indium may be used. In the case of using a plurality of elements together, the proportion of each element can be set arbitrarily. Among the aforementioned combinations, it is desirable in terms of the cost to use a combination of tin as a first major element and one or both of bismuth and indium as a second element. Alternatively, the metal coating layer 64 may be formed from an alloy such as tin-copper, tin-silver or tin-lead subjected to the melting process. In this case as well, the melting point can be reduced as compared to the case of using only tin.

In the case where the metal coating layer 64 is formed from a combination of the plurality of elements as described above, it is desirable that the second element not only has the aforementioned property to reduce the melting point when being added to the first element, but also such a property that an oxide thereof has higher electrical conductivity than that of an oxide of the first element. In this case, it is also desirable that the second element has stronger affinity to oxygen than that of the first element. With such a structure, the effect of ensuring the overall electrical conductivity of the separator can be obtained. In other words, if the second element has stronger affinity to oxygen, it moves toward the surface of the separator within the metal coating layer 64 and tries to bond to oxygen in preference to the first element. If the resulting oxide of the second element has higher electrical conductivity than that of the oxide of the first element, increase in overall resistance of the separator due to oxidation can be suppressed. For example, such an effect is obtained in the case where the metal coating layer 64 is formed from tin as the first element and indium as the second element. This is because indium oxide has higher electrical conductivity than that of tin oxide. In addition to the combination of tin and bismuth, such an effect can also be obtained in the case where the metal coating layer 64 is formed from a combination of tin and indium, tin and copper, tin and silver, or the like.

FIG. 8 is an illustration showing the examination result regarding an increase in contact resistance of various separators before and after they are subjected to a predetermined treatment. The separators of FIG. 8 have the same structure as that of the separator 30 of this embodiment, but the respective metal coating layers 64 were made under various conditions. In FIG. 8, A is a separator whose metal coating layer 64 was formed by tin-bismuth alloy plating and was not subjected to the melting process; B is a separator whose metal coating layer 64 was formed from a tin-bismuth alloy and was subjected to the melting process as in the above embodiment; C is a separator whose metal coating layer 64 was formed from a tin-bismuth alloy and was water-cooled (immersed in water for quenching) in the cooling step of the melting process; and D is a separator whose metal coating layer 64 was formed from tin and was subjected to the melting process (involving gradual air-cooling).

The aforementioned predetermined treatment is a process of exposing the separator to an environment similar to the internal environment of the fuel cell for a predetermined time. Herein, each separator was immersed in hot water (80° C.) for 24 hours. A single cell was formed with each separator before and after such a process, and the contact resistance in each cell was measured. Measurement of the contact resistance of the separators was conducted as follows: each separator was laminated with a carbon cloth (corresponding to the gas diffusion electrode that is an adjacent member within the aforementioned single cell 28) and the resultant lamination was held with pressing force applied thereto. Then, a constant current (1 A) was applied thereto, whereby a voltage drop was measured. A resistance value was obtained from the current and voltage values, whereby a change in the resistance value (the resistance value multiplied by the contact area) before and after the aforementioned process was examined (unit: $m\Omega cm^2$). It is found from the result of FIG. 8 that, due to the aforementioned process, the metals forming the respective separators were oxidized to produce a less conductive oxide, thereby increasing the contact resistance. Note that herein was measured the overall resistance value of the lamination of the separator and gas diffusion electrode that is held with the pressing force applied thereto. Thus, the comparison was made based on the overall resistance value (including the contact resistance resulting from oxidation of the metal forming the separator) affected by the pressing force and the like, in order to reflect the condition of the fuel cell stack.

It can be said from the result of separators A and B in FIG. 8 that the effect of suppressing increase in contact resistance can be obtained by conducting the melting process to form the metal coating layer 64. Moreover, it is found from the result of separators B and C that the remarkable effect of suppressing increase in contact resistance can be obtained by conducting slow cooling (air-cooling rather than water-cooling) in the melting process so as to increase the crystal grain size. Moreover, it can be said from the result of separators B and D that, by using bismuth in addition to tin (the first element) as the low-melting-point metal forming the metal coating layer 64, the contact resistance itself can be reduced (the resistance value before the process is also reduced) as well as the effect of suppressing increase in contact resistance due to oxidation can further be improved.

Note that, among the separators of FIG. 8, in separator A whose metal coating layer was not subjected to the melting process, the average grain size of the crystal grains in the metal coating layer is several micrometers. In separator B whose metal coating layer was subjected to air-cooling in the melting process, the average grain size of the crystal grains is 0.1 mm. In separator C whose metal coating layer was subjected to water-cooling in the melting process, the average grain size of the crystal grains is several tens of micrometers. The effect obtained by conducting the melting process to the low-melting-point metal forming the metal coating layer can be improved by conducting the cooling step at a lower rate after the melting step in the melting process, i.e., by increasing the average grain size of the metal grains. As described above, with the average grain size of the crystal grains being 0.1 mm or more, a sufficient effect can be obtained in terms of suppressing the contact resistance of the separator.

Note that, in this embodiment, tin that is susceptible to oxidation was used as the first element to form the metal coating layer 64. Accordingly, the remarkable effect of suppressing increase in contact resistance can be obtained as shown in FIG. 8. However, even if the metal coating layer 64 is formed from a metal that is less susceptible to oxidation than tin, or a low-melting-point metal that is susceptible to elution due to corrosion, the effect of suppressing oxidation and elution of the metal coating layer 64 itself as well as the aforementioned effect of suppressing elution of the metals forming the lower layers can be obtained by increasing the grain size (reducing the grain boundary density) by the melting process and thus changing the state of the grain boundaries as described above.

Figure 9:
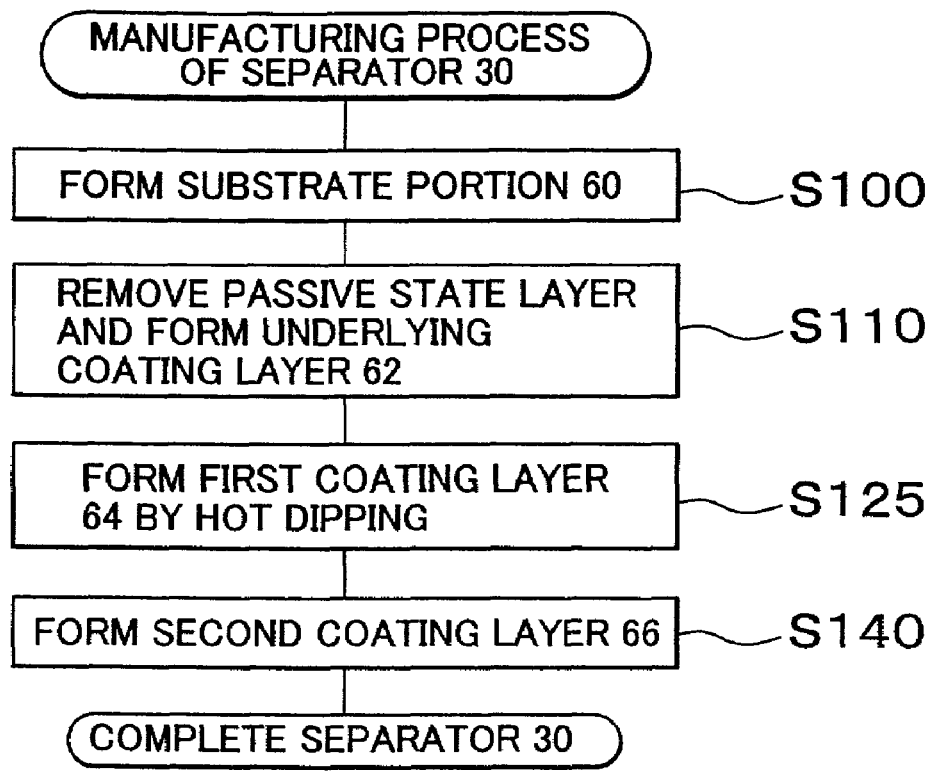
FIG. 9 is an illustration showing a modification of the manufacturing process of the separator 30.

As shown in FIG. 5, in the separator 30 of this embodiment, the plating layer was first formed on the substrate portion 60 and the underlying coating layer 62, and then subjected to the melting process to form the metal coating layer 64. However, formation of the plating layer of the metal coating layer 64 and the melting process thereof may be conducted simultaneously. Such a manufacturing method is shown in FIG. 9 as a modification of the manufacturing method of the separator 30 of the first embodiment. The manufacturing process of the separator 30 shown in FIG. 9 is substantially the same as that shown in FIG. 5, except that hot dipping is conducted as Step S125, instead of Steps S120 and S130 of FIG. 5.

Hot dipping is a process of simultaneously conducting formation of the plating layer and the melting process thereof as described above. More specifically, a low-melting-point metal is melted by heating at a predetermined temperature (which is a temperature that does not affect a base material to be plated), and the base material to be plated is dipped into the resultant liquid low-melting-point metal so as to form a molten metal layer thereon. Then, the molten metal layer is cooled to form the plating layer. In the manufacturing process of the separator 30 shown in FIG. 9, i.e., in the modification of the first embodiment, the substrate portion 60 having the underlying coating layer 62 formed thereon is dipped into the liquid molten metal of tin and bismuth, and then air-cooled to form the metal coating layer 64.

Thus, in the case where the separator 30 is manufactured by the manufacturing method of FIG. 9 as well, the grain boundary density of the metal coating layer 64 can be suppressed as compared to that of the plating layer formed by normal electroplating or electroless plating, and also the isometric crystal grains rather than columnar crystal grains can be mainly obtained. Thus, the same effects as those of the separator 30 manufactured by the manufacturing method of FIG. 5 can be obtained.

Figure 10:
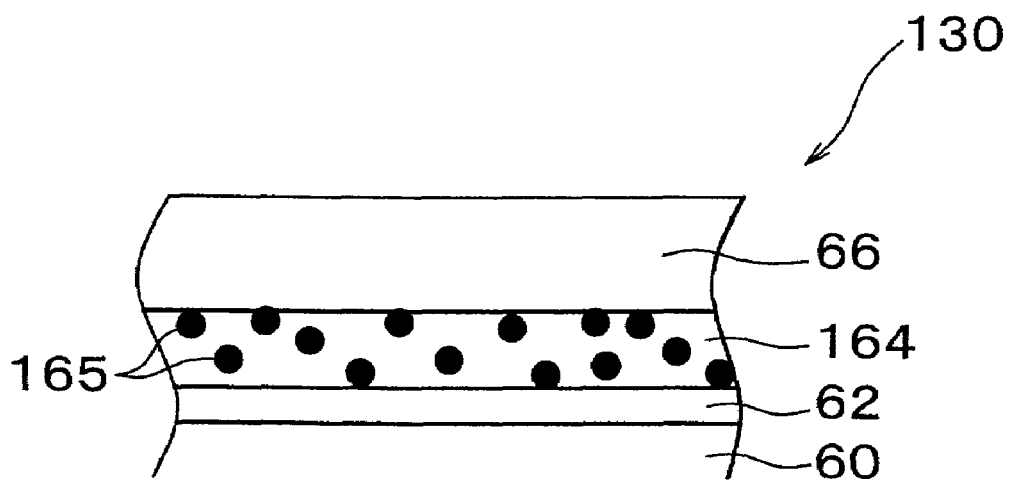
FIG. 10 is an illustration showing the structure of a separator 130.

(4) Structure of Separator 130:

In the case where the low-melting-point metal forming the metal coating layer 64 is such a metal that has reduced electrical conductivity in the form of oxide, it is possible to conduct the melting process as described above in order to reduce the grain boundary density and thus suppress the progress in oxidation. In addition to such a structure, the following structure is also possible. FIG. 10 is an illustration showing the structure of a separator 130 of a second embodiment. The separator 130 shown in FIG. 10 has substantially the same structure as that of the separator 30 of the first embodiment, and is integrated into the same fuel cell. Therefore, the common members are denoted with the same reference numerals and detailed description thereof is omitted. The separator 130 has a metal coating layer 164 instead of the metal coating layer 64 of the separator 30. Like the metal coating layer 64, the metal coating layer 164 is formed from a low-melting-point metal, tin-bismuth alloy, and has been subjected to the melting process. However, the metal coating layer 164 further has electrically conductive particles 165 dispersed therein. The conductive particles 165 of the metal coating layer 164 are dispersed in a sufficient amount from the surface of the metal coating layer 164 (the surface that is in contact with the carbon coating layer 66) across the inside thereof.

Note that the conductive particles 165 may be any particles as long as they are formed from a material that is stable enough (i.e., the degree of corrosion is small enough) as well as conductive enough during the manufacturing process of the separator 130 or when the separator 130 is provided within the fuel cell. For example, graphite particles, noble metal particles, or conductive ceramic particles may be used. Examples of the conductive ceramics include nitrides such as titanium nitride and chromium nitride, or oxides such as tungsten oxide, indium oxide and ITO (complex oxide of indium and tin).

In order to manufacture such a separator 130, the step of forming a tin-bismuth alloy plating layer on the substrate portion 60 (Step 120) in the manufacturing process of the separator 30 shown in FIG. 5 need only be replaced with the step of forming a tin-bismuth alloy plating layer having the conductive particles 165 dispersed therein. For example, in this step, the substrate portion 60 having the underlying coating layer 62 formed thereon is subjected to a plating process with a predetermined amount of conductive particles 165 mixed in the tin-bismuth alloy plating bath, so that a tin-bismuth alloy plating layer having the conductive particles 165 dispersed therein is formed. Alternatively, the metal coating layer 164 may be formed by spraying the mixture of a predetermined amount of conductive particles 165 with melted tin and bismuth.

According to the separator 130 of the second embodiment structured as such, the effect of further suppressing increase in contact resistance (reduction in electrical conductivity) due to oxidation of the separator can be obtained. Moreover, by forming the same fuel cell as that of the first embodiment with the separator 130, degradation in fuel cell performance resulting from oxidation of the separator can be suppressed, whereby the durability of the fuel cell can be improved.

More specifically, even if the tin-bismuth alloy forming the metal coating layer 164 is gradually oxidized at its grain boundaries, the conductive particles 165 dispersed in the metal coating layer 164 ensure the electrical conductivity, so that excessive reduction in electrical conductivity of the metal coating layer 164 can be suppressed. Note that the metal coating layer 164 has an increased crystal grain size and thus a reduced grain boundary density as a result of the melting process of the low-melting-point metal. Therefore, the progress in oxidation inside the metal coating layer 164 can be suppressed. However, even the melting process cannot reduce the area of the interface, i.e., the boundary of the metal coating layer 164 with the carbon coating layer 66. Accordingly, in the case where the conductive particles 165 are dispersed in the metal coating layer 164 as described above, the remarkable effect of assuring the overall electrical conductivity of the separator can be obtained by dispersing the conductive particles 165 at least at the interface with the carbon coating layer 66. Moreover, the amount of conductive particles 165 in the metal coating layer 164 may be determined as appropriate according to the degree of conductivity required for the separator 130 and easiness of forming the metal coating layer 164 including the conductive particles 165.

Note that, in the second embodiment, the metal coating layer 164 having the conductive particles 165 dispersed therein is formed from the tin-bismuth alloy. However, the metal coating layer 164 may be formed from another low-melting-point metal (a single metal (e.g., tin) or an alloy (e.g., tin-indium alloy). The effect resulting from dispersion of the conductive particles 165 can be sufficiently obtained if the metal forming the metal coating layer 164 is a low-melting-point metal like tin that may be gradually oxidized in the internal environment of the fuel cell in the state where the carbon coating layer 66 is formed thereon.

Moreover, in the second embodiment, the underlying coating layer 62 is provided between the metal coating layer 164 and the substrate portion 60. However, provided that the rate at which a passive state layer is formed at the substrate portion 60 is low enough, or formation of such a passive state layer at the substrate portion 60 need not be considered, the metal coating layer 164 may be provided directly onto the substrate portion 60. In this case, in order to prevent the metal forming the substrate portion 60 from being eluted through the metal coating layer 164 due to corrosion, it is desirable to form the metal coating layer 164 with a sufficient thickness.

Figures 11, 12:
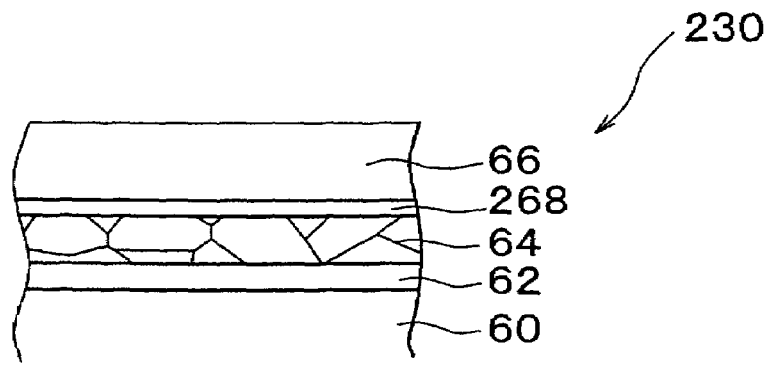
FIG. 11 is an illustration showing the structure of a separator 230.
FIG. 12 is an illustration showing the evaluation result regarding the capability of a separator having a molten tin layer.

(5) Structure of Separator 230:

In the second embodiment, the conductive particles 165 are dispersed in the metal coating layer 164 in order to suppress the increase in contact resistance in the metal coating layer 164, and particularly, at the interface between the metal coating layer 164 and the carbon coating layer 66. However, such contact resistance may alternatively be suppressed by a different structure. FIG. 11 is an illustration showing the structure of a separator 230 of a third embodiment. The separator 230 has substantially the same structure as that of the separator 30 of the first embodiment, and is integrated into the same fuel cell. Therefore, the common members are denoted with the same reference numerals, and detailed description thereof is omitted. The separator 230 has a corrosion-resistant coating layer 268 between the metal coating layer 64 and the carbon coating layer 66 which are the same as those of the separator 30. This corrosion-resistant coating layer 268 is formed from a noble metal (such as gold, silver, platinum and rhodium), or chemically stable, conductive ceramics (such as TiN, CrN and DLN (diamond-like carbon)).

In order to manufacture such a separator 230, the step of applying noble metal plating onto the metal coating layer 64 need only be conducted between the step of forming the metal coating layer 64 by the melting process (Step S130) in the manufacturing process of the separator 30 shown in FIG. 5 or the step of forming the metal coating layer 64 by hot dipping (Step S125) in the manufacturing process of the separator 30 shown in FIG. 9 and the step of forming the carbon coating layer 66 (Step S140).

According to the separator 230 of the third embodiment structured as such, the effect of further suppressing increase in contact resistance (reduction in electrical conductivity) due to oxidation of the separator can be obtained. Moreover, by forming the same fuel cell as that of the first embodiment with the separator 230, degradation in fuel cell performance resulting from oxidation of the separator can be suppressed, whereby durability of the fuel cell can be improved.

More specifically, the metal coating layer 64 has an increased crystal grain size and thus a reduced grain boundary density as a result of the melting process of the low-melting-point metal. Therefore, the progress in oxidation inside the metal coating layer 64 can be suppressed. However, even the melting process cannot reduce the area of the interface with the carbon coating layer 66. Accordingly, by forming the corrosion-resistant coating layer 268 from a noble metal on the metal coating layer 64 as described above, oxidation at the surface of the metal coating layer 64 covered therewith can be suppressed. The noble metal has excellent corrosion resistance and also has extremely low activity of oxidation and elution resulting from ionization. Therefore, with such a structure, sufficient overall electrical conductivity of the separator can be ensured.

Note that, in the third embodiment, the metal coating layer 64 is formed from the tin-bismuth alloy. However, the metal coating layer 64 may be formed from another low-melting-point metal (a single metal (e.g., tin) or an alloy (e.g., tin-indium alloy). The effect resulting from formation of the corrosion-resistant noble metal coating layer 268 can be sufficiently obtained if the metal forming the metal coating layer 64 is a low-melting-point metal like tin that may be gradually oxidized in the internal environment of the fuel cell in the state where the carbon coating layer 66 is formed thereon.

Note that, in the separator 230 of the third embodiment, the metal coating layer 64, which is a lower layer covered with the noble metal, is formed from the low-melting-point metal subjected to the melting process, in order to prevent metal elution resulting from corrosion of the metal coating layer. Accordingly, the corrosion-resistant noble metal coating layer 268 need not be thick enough to prevent the metal forming the lower layer from being eluted by corrosion (i.e., need not be thick enough to suppress the number of micro plating-defects sufficiently). The corrosion-resistant coating layer 268 need only be formed by ultra-thin noble metal plating so as to merely prevent oxidation at the surface of the metal coating layer 64. Accordingly, excessive increase in cost resulting from the use of the noble metal can be suppressed. Since oxidation at the surface of the metal coating layer 64 can be prevented by the corrosion-resistant coating layer 268, the contact resistance of the separator 230 can be sufficiently suppressed.

In the third embodiment, the underlying coating layer 62 is provided between the metal coating layer 64 and the substrate portion 60. However, provided that the rate at which a passive state layer is formed at the substrate portion 60 is low enough, or formation of such a passive state layer at the substrate portion 60 need not be considered, the metal coating layer 64 may be provided directly onto the substrate portion 60. In this case, in order to prevent the metal forming the substrate portion 60 from being eluted through the metal coating layer 64 due to corrosion, it is desirable to form the metal coating layer 64 with a sufficient thickness.

Note that, in the aforementioned first to third embodiments, the underlying coating layer 62 is provided between the metal coating layer and the substrate portion 60. This underlying coating layer 62 is formed in order to improve adhesion between the substrate portion 60 and the metal coating layer. Therefore, the underlying coating layer 62 may be eliminated if the adhesion between the substrate portion 60 and the metal coating layer is high enough. Moreover, in addition to the structure provided with the underlying coating layer 62, any technology capable of improving the adhesion between the substrate portion 60 and the metal coating layer can be applied to the separators of the aforementioned embodiments so that a predetermined effect such as reduction in internal resistance of the fuel cell can be obtained.

Moreover, in the aforementioned first to third embodiments, the stacked structure from the underlying coating layer 62 up to the carbon coating layer 66 is formed over the whole surface of the separator so as to ensure the electrical conductivity and corrosion resistance. However, such a stacked structure of the layers may alternatively be provided only in the region of the separator associated with electrical contact resistance when the separator is brought into contact with an adjacent member within the fuel cell. Such a structure can also realize desired overall corrosion resistance and electrical conductivity of the separator as long as sufficient corrosion resistance in the other regions can be ensured by a different method.

As described above, the fuel cell separator forms the flow paths of the fuel gas or oxidized gas at either surface thereof. In addition to this, the fuel cell separator may also form flow paths of the coolant for adjusting the operating temperature of the fuel cell at least at one surface thereof. The invention is also applicable to such a separator having the coolant flow paths formed therein, whereby sufficient corrosion resistance of the separator (resistance to oxidation and elution due to corrosion) can be ensured. It should be noted that such a separator does not necessarily have the same structure as that of the above embodiments at the surface forming the coolant flow paths. In other words, on the side passing the coolant therethrough, the separator does not have so strongly acidic conditions like pH 2 as fin the inside of the single cell, but is normally approximately in the neutral state according to the property of the coolant. Therefore, a metal is much less susceptible to corrosion. Moreover, since the separator does not directly communicate with the solid polymer electrolyte membrane on this side, the eluted metal ions do not immediately affect the fuel cell performance. Accordingly, all that is required on the side forming the coolant flow path is that the separator can maintain sufficient conductivity and is durable enough to serve as a constituent member of the fuel cell. For example, the carbon coating layer 66 may be eliminated in each structure of the aforementioned embodiments. In this case as well, the predetermined effects resulting from formation of the metal layer subjected to the melting process (the effect of suppressing elution of the lower layers and the effect of suppressing increase in contact resistance) can be obtained.

Note that the separator having the metal coating layer formed from the tin-bismuth alloy has been described in the above embodiments. However, the predetermined effects resulting from the melting process can be obtained even if the metal coating layer is formed from, e.g., only tin as described above rather than such an alloy. FIG. 12 shows as fourth and fifth embodiments the evaluation result regarding the capability of the separator having a metal coating layer of tin subjected to the melting process, instead of the metal coating layer 64 formed from tin and bismuth.

Each of the separators compared in FIG. 12 has the same structure as that of the separator 230 of the third embodiment. In other words, each separator has a corrosion-resistant coating layer formed from silver, a noble metal, on the metal coating layer formed from tin, a molten metal. More specifically, in FIG. 12, comparison of corrosion current and contact resistance was made between separator E having a corrosion-resistant coating layer of silver and an underlying coating layer of copper, separator F having a corrosion-resistant coating layer of silver, a metal coating layer of tin (without the melting process) and an underlying coating layer of copper, and separator G (corresponding to the separators of the fourth and fifth embodiments) having a corrosion-resistant coating layer of silver, a metal coating layer of tin (with the melting process) and an underlying coating layer of copper.

In FIG. 12, each separator used to examine the contact resistance was provided with a carbon coating layer of the carbon materials as in the aforementioned embodiments. However, each separator used to examine the corrosion current was not provided with the carbon coating layer of the carbon materials. Hereinafter, separator G that was not provided with the carbon coating layer and was used to examine the corrosion current is referred to as the separator of the fourth embodiment, and separator G that was provided with the carbon coating layer and was used to examine the contact resistance is referred to as the separator of the fifth embodiment. Note that, in each separator, the corrosion-resistant coating layer of silver has a thickness of 0.1 μm, and each of the underlying coating layer of copper and the metal coating layer of tin has a thickness of 10 μm. The respective substrate portions of separators E, F and G were formed from aluminum.

Figure 13:
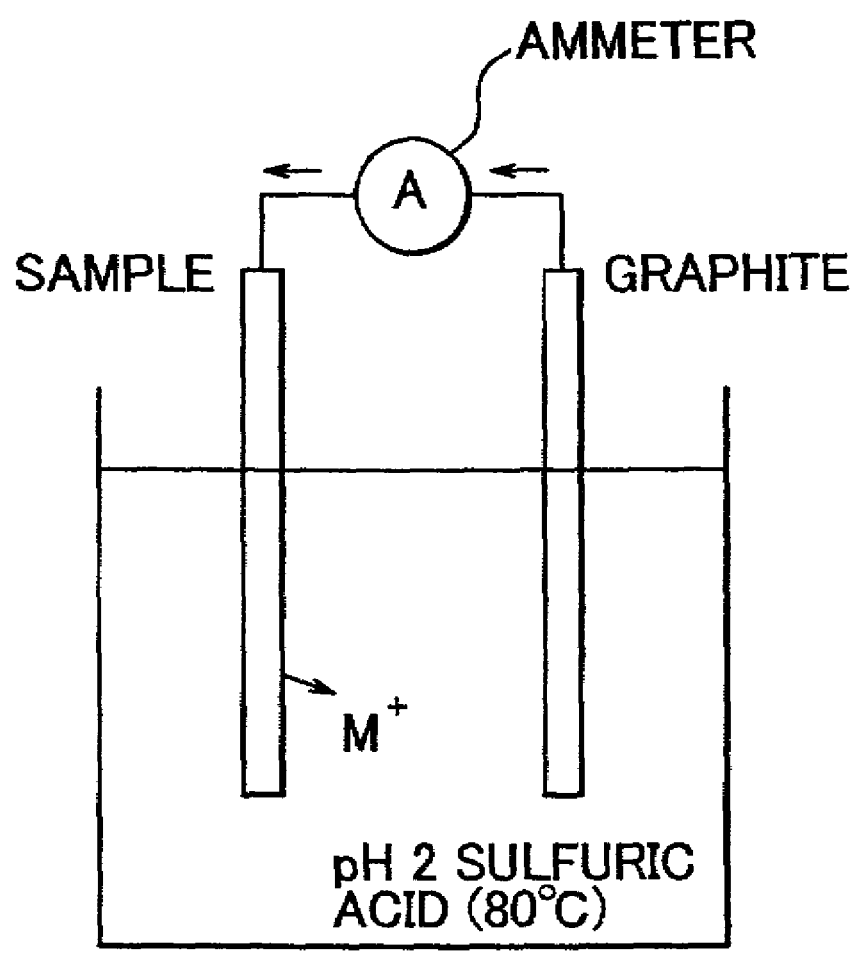
FIG. 13 is an illustration showing the state where a corrosion current is measured.

In FIG. 12, the examination result regarding the corrosion current shows whether or not the corrosion current is produced in the environment similar to the internal environment of the fuel cell. The presence/absence of corrosion can be determined from this result. FIG. 13 is an illustration showing the state where the corrosion current of each separator is measured. Measurement of the corrosion current was conducted as follows: each sample separator was used as one electrode, and a graphite electrode was used as a counter electrode. In sulfuric acid of pH 2 at 80° C., a current (per unit area of the sample immersed in the sulfuric acid) flowing between the separator and the graphite electrode which were electrically connected to each other was measured as corrosion current (unit: $\mu A/cm^2$). In the case where the corrosion proceeds in the separator of interest, metal ions (shown by $M^+$ in FIG. 13) are eluted from the sample separator with the progress in corrosion, and the current flows. Note that such a corrosion current was measured after each sample separator was immersed in the sulfuric acid of pH 2 at 80° C. for 24 hours.

Moreover, in FIG. 12, the examination result regarding a change in contact resistance shows the change in contact resistance before and after each of the above separators was exposed to the environment similar to the internal environment of the fuel cell for a predetermined time. More specifically, separators E to G each having the carbon coating layer of the carbon materials were immersed in the sulfuric acid of pH 2 at 80° C. for 24 hours, and the change in contact resistance before and after the immersion was examined. Measurement of the contact resistance of the separators was conducted as follows: each separator was laminated with a carbon cloth (corresponding to the gas diffusion electrode that is an adjacent member within the aforementioned single cell 28) and the resultant lamination was held with pressing force applied thereto. Then, a constant current (1 A) was applied thereto, whereby a voltage drop was measured. A resistance value was obtained from the current and voltage values, whereby a change in the resistance value (the resistance value multiplied by the contact area) before and after the aforementioned acid treatment was examined (unit: $m\Omega cm^2$). Note that herein was measured the overall resistance value of the lamination of the separator and gas diffusion electrode that is held with the pressing force applied thereto. Thus, the comparison was made based on the overall resistance value (including the contact resistance produced at the separator surface) affected by the pressing force and the like, in order to reflect the condition of the fuel cell stack.

As shown in FIG. 12, comparison between separator F having the metal coating layer of tin that was not subjected to the melting process and separator G (separator of the fourth embodiment) having the metal coating layer subjected to the melting process shows that separator G has a much smaller corrosion current. Therefore, corrosion resistance of the separator can be significantly improved by conducting the melting process to the tin layer. Herein, the ionization tendency of copper forming the metal coating layer of separator E is smaller than that of tin forming the metal coating layer of separator F. Therefore, separator E has a smaller corrosion current than that of separator F. However, separator G in which tin was subjected to the melting process (separator of the fourth embodiment) has a corrosion current smaller than that of separator E (the corrosion rate is reduced to about one-twentieth or less).

As described above, each separator used to measure the corrosion current is not provided with the carbon coating layer of the carbon materials, and the corrosion-resistant coating layer of the noble metal is as thin as 0.1 µm, which is not enough to ensure the corrosion resistance of the separator by the corrosion-resistant coating layer. However, separator G (separator of the fourth embodiment) has a corrosion current that is small enough. Therefore, it can be said that the melting process of the low-melting-point metal such as tin makes it possible to ensure sufficient corrosion resistance of the separator. If separator G is further provided with the carbon coating layer of the carbon materials as in the aforementioned embodiments (this separator corresponds to the separator of the fifth embodiment), the separator being durable over the long-time use within the fuel cell and having better corrosion resistance can be obtained. Separators E to G (separator G corresponds to the separator of the fifth embodiment) have a corrosion-resistant coating layer of the noble metal (silver). Therefore, each separator has sufficiently low measured contact resistance. Thus, as described above, the corrosion resistance is sufficiently improved by the melting process as well as the contact resistance is sufficiently suppressed (oxidation is prevented) by providing the corrosion-resistant coating layer, whereby a separator having excellent capability can be obtained.

Note that, like the third embodiment, in the separator of the fifth embodiment shown in FIG. 12, the contact resistance is suppressed (oxidation is suppressed) by providing the corrosion-resistant coating layer of the noble metal. However, like the second embodiment, the contact resistance may be suppressed by providing the electrically conductive particles within the metal coating layer of the low-melting-point metal (such as tin) subjected to the melting process. In such a structure as well, the corrosion resistance is sufficiently improved by the melting process as well as the electrical conductivity is ensured by the conductive particles. As a result, excellent capability can be realized in the separator.

FIG. 14 is an illustration summarizing embodiments of the separator that are possible according to the invention. Regarding the separator base material, presence/absence of the predetermined treatment, structure of the metal coating layer, presence/absence of the conductive particles in the metal coating layer, presence/absence of the corrosion-resistant coating layer, and presence/absence of the carbon coating layer, any combination shown in FIG. 14 may be selected for the separator of the invention, according to the conditions under which the separator is used.

The embodiments of the invention have been described as above. It should be understood that the invention is not limited to the above-described embodiments and can be embodied in various forms without departing from the spirit and scope of the invention.

What is claimed is:

1. A fuel cell separator integrated into a fuel cell and forming a fluid flow path, comprising:

a separator base material having a surface; and a metal coating layer formed from a metal and formed at least on the surface of the separator base material in a region of the separator associated with electrical contact resistance between the separator and an adjacent member of the fuel cell when the separator is brought into contact with the adjacent member when the separator is integrated into the fuel cell, wherein the metal coating layer comprises crystal grains having an average grain size of 0.1 mm or more, resulting from melting and gradual cooling of the coating layer on the separator base material, and wherein the metal coating layer formed from the metal contains a substance added to the metal which reduces a melting point of the metal when added to the metal.

2. A fuel cell separator integrated into a fuel cell and forming a fluid flow path, comprising:

a separator base material having a surface; and a metal coating layer formed from a metal and formed at least on the surface of the separator base material in a region of the separator associated with electrical contact resistance between the separator and an adjacent member of the fuel cell when the separator is brought into contact with the adjacent member when the separator is integrated into the fuel cell, wherein the metal coating layer comprises crystal grains having an average grain size of 0.1 mm or more, resulting from melting and gradual cooling of the coating layer on the separator base material, and wherein the metal is tin or a tin alloy.

3. A fuel cell separator integrated into a fuel cell and forming a fluid flow path, comprising:

a separator base material having a surface; and a metal coating layer formed from a metal and formed at least on the surface of the separator base material in a region of the separator associated with electrical contact resistance between the separator and an adjacent member of the fuel cell when the separator is brought into contact with the adjacent member when the separator is integrated into the fuel cell, wherein the metal coating layer comprises crystal grains having an average grain size of 0.1 mm or more, resulting from melting and gradual cooling of the coating layer on the separator base material, and wherein the metal is a tin alloy having a lower melting point than that of tin.

4. A fuel cell separator integrated into a fuel cell and forming a fluid flow path, comprising:

a separator base material having a surface; and a metal coating layer formed from a metal and formed at least on the surface of the separator base material in a region of the separator associated with electrical contact resistance between the separator and an adjacent member of the fuel cell when the separator is brought into contact with the adjacent member when the separator is integrated into the fuel cell, wherein the metal coating layer comprises crystal grains having an average grain size of 0.1 mm or more, resulting from melting and gradual cooling of the coating aver on the separator base material, and wherein the metal coating layer has a corrosion-resistant coating layer formed on the surface of the metal coating layer, the corrosion-resistant coating layer being formed from a corrosion resistant, electrically conductive substance.

5. A fuel cell separator integrated into a fuel cell and forming a fluid flow path, comprising:

a separator base material having a surface; and a metal coating layer formed from a metal and formed at least on the surface of the separator base material in a region of the separator associated with electrical contact resistance between the separator and an adjacent member of the fuel cell when the separator is brought into contact with the adjacent member when the separator is integrated into the fuel cell, wherein the metal coating layer comprises crystal grains having an average grain size of 0.1 mm or more, resulting from melting and gradual cooling of the coating layer on the separator base material, and further comprising a carbon coating layer of a carbon material formed at least on the region of the separator base material where the metal coating layer is formed.

6. A fuel cell separator integrated into a fuel cell and forming a fluid flow path, comprising:

a separator base material; and a metal coating layer formed from a metal and formed at least on the surface of the separator base material in a region of the separator base material associated with an electrical contact resistance between the separator and an adjacent member of the fuel cell when the separator is brought into contact with the adjacent member when the separator is integrated into the fuel cell, wherein crystal grains of the metal forming the metal coating layer have an average grain size of 0.1 mm or more, and wherein the metal coating layer formed from the metal contains a substance added to the metal which reduces a melting point of the metal when added to the metal.

7. A fuel cell separator integrated into a fuel cell and forming a fluid flow path, comprising:

a separator base material; and a metal coating layer formed from a metal and formed at least on the surface of the separator base material in a region of the separator base material associated with an electrical contact resistance between the separator and an adjacent member of the fuel cell when the separator is brought into contact with the adjacent member when the separator is integrated into the fuel cell, wherein crystal grains of the metal forming the metal coating layer have an average grain size of 0.1 mm or more, and wherein the metal is tin or a tin alloy.

8. A fuel cell separator integrated into a fuel cell and forming a fluid flow path, comprising:

a separator base material; and a metal coating layer formed from a metal and formed at least on the surface of the separator base material in a region of the separator base material associated with an electrical contact resistance between the separator and an adjacent member of the fuel cell when the separator is brought into contact with the adjacent member when the separator is integrated into the fuel cell, wherein crystal grains of the metal forming the metal coating layer have an average grain size of 0.1 mm or more, and wherein the metal is a tin alloy having a lower melting point than that of tin.

9. A fuel cell separator integrated into a fuel cell and forming a fluid flow path, comprising:

a separator base material; and a metal coating layer formed from a metal and formed at least on the surface of the separator base material in a region of the separator base material associated with an electrical contact resistance between the separator and an adjacent member of the fuel cell when the separator is brought into contact with the adjacent member when the separator is integrated into the fuel cell, wherein crystal grains of the metal forming the metal coating layer have an average grain size of 0.1 mm or more, and wherein the metal coating layer has a corrosion-resistant coating layer formed on the surface of the metal coating layer, the corrosion-resistant coating layer being formed from a corrosion resistant, electrically conductive substance.

10. A fuel cell separator integrated into a fuel cell and forming a fluid flow path, comprising:

a separator base material; and a metal coating layer formed from a metal and formed at least on the surface of the separator base material in a region of the separator base material associated with an electrical contact resistance between the separator and an adjacent member of the fuel cell when the separator is brought into contact with the adjacent member when the separator is integrated into the fuel cell, wherein crystal grains of the metal forming the metal coating layer have an average grain size of 0.1 mm or more, and further comprising a carbon coating layer of a carbon material formed at least on the region of the separator base material where the metal coating layer is formed.

* * * * *

UNITED STATES PATENT AND TRADEMARK OFFICE
CERTIFICATE OF CORRECTION

PATENT NO. : 7,052,794 B2
APPLICATION NO. : 09/837480
DATED : May 30, 2006
INVENTOR(S) : Nakata et al.

It is certified that error appears in the above-identified patent and that said Letters Patent is hereby corrected as shown below:

| Column | Line | |
|--------|------|---|
| 25 | 33 | Change "aver" to -- layer --. |

Signed and Sealed this

Twelfth Day of September, 2006

JON W. DUDAS
*Director of the United States Patent and Trademark Office*